United States Patent
Jin et al.

(10) Patent No.: US 11,596,020 B2
(45) Date of Patent: *Feb. 28, 2023

(54) METHOD AND APPARATUS FOR OPERATING METHOD WHEN TERMINAL RECEIVES RRC RECONFIGURATION MESSAGE INCLUDING CONFIGURATION OF SECONDARY CELL GROUP IN NEXT-GENERATION MOBILE COMMUNICATION SYSTEM

(71) Applicant: SAMSUNG ELECTRONICS CO., LTD., Suwon-si (KR)

(72) Inventors: Seungri Jin, Suwon-si (KR); Soenghun Kim, Suwon-si (KR); Suyoung Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/659,618

(22) Filed: Apr. 18, 2022

(65) Prior Publication Data

US 2022/0240342 A1 Jul. 28, 2022

Related U.S. Application Data

(63) Continuation of application No. 16/790,500, filed on Feb. 13, 2020, now Pat. No. 11,310,862.

(30) Foreign Application Priority Data

Feb. 13, 2019 (KR) .................. 10-2019-0016636

(51) Int. Cl.
*H04W 76/27* (2018.01)
*H04W 74/08* (2009.01)
*H04W 76/15* (2018.01)

(52) U.S. Cl.
CPC ....... *H04W 76/27* (2018.02); *H04W 74/0833* (2013.01); *H04W 76/15* (2018.02)

(58) Field of Classification Search
None
See application file for complete search history.

(56) References Cited

U.S. PATENT DOCUMENTS

2016/0255675 A1 9/2016 Van Lieshout et al.
2019/0045568 A1 2/2019 Palat et al.
(Continued)

FOREIGN PATENT DOCUMENTS

WO 2018147677 A1 8/2018

OTHER PUBLICATIONS

3GPP TS 36.331 V15.3.0 (Sep. 2018); Technical Specification;3rd Generation Partnership Project; Technical Specification Group Radio Access Network; Evolved Universal Terrestrial Radio Access (E-UTRA); Radio Resource Control (RRC); Protocol specification (Release 15).

(Continued)

*Primary Examiner* — Basil Ma

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides an operating method when a terminal receives an RRC reconfiguration message includ- (Continued)

ing configuration of a secondary cell group in a next-generation mobile communication system, and an apparatus therefor.

14 Claims, 21 Drawing Sheets

(56) References Cited

U.S. PATENT DOCUMENTS

| | | | |
|---|---|---|---|
| 2020/0260347 A1 | 8/2020 | Xu et al. | |
| 2020/0267631 A1 | 8/2020 | Yilmaz et al. | |
| 2020/0351968 A1 | 11/2020 | Yilmaz et al. | |
| 2021/0014923 A1* | 1/2021 | Palat | H04W 76/19 |

OTHER PUBLICATIONS

Suer et al., "Multi-Connectivity as an Enabler for Reliable Low Latency Communications" IEEE Communications Surveys & Tutorials (vol. 22, Issue: 1, Firstquarter 2020), Oct. 28, 2019, pp. 156-169.

* cited by examiner

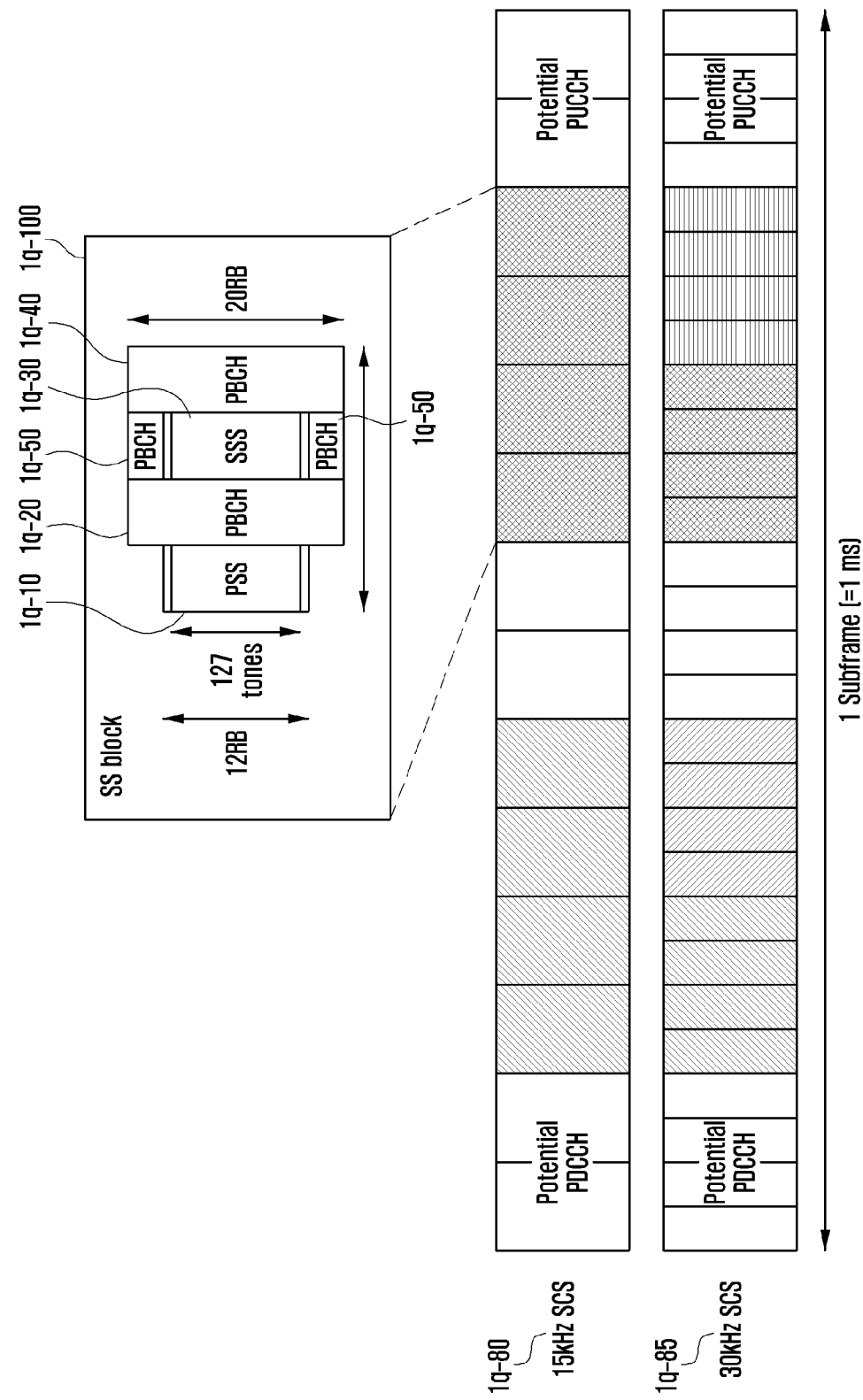

METHOD AND APPARATUS FOR OPERATING METHOD WHEN TERMINAL RECEIVES RRC RECONFIGURATION MESSAGE INCLUDING CONFIGURATION OF SECONDARY CELL GROUP IN NEXT-GENERATION MOBILE COMMUNICATION SYSTEM

CROSS-REFERENCE TO RELATED APPLICATIONS

This application is a continuation of U.S. application Ser. No. 16/790,500, filed Feb. 13, 2020, which is based on and claims priority under 35 U.S.C. 119 to Korean Patent Application No. 10-2019-0016636, filed Feb. 13, 2019, in the Korean Intellectual Property Office, the disclosures of which are herein incorporated by reference in their entirety.

BACKGROUND

1. Field

The disclosure relates to an operating method when a terminal receives an RRC reconfiguration message including configuration of a secondary cell group in a next-generation mobile communication system, and an apparatus therefor.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

An aspect of the disclosure is to specify, for a terminal supporting multi-radio access technology (RAT) dual connectivity (MR-DC), a procedure in a case where an RRC reconfiguration message includes configuration of a secondary cell group in a new radio (NR) system. In particular, consideration may be given to: which signaling radio bearer is used to deliver the corresponding RRC reconfiguration message; a method for, when signaling radio bearer 1 (SRB1) is used to deliver the same, identifying whether the corresponding RRC reconfiguration message includes the configuration of the secondary cell group, and delivering an indication so that the secondary cell group can perform random access; a method for generating and delivering an RRC reconfiguration complete message; a method for applying a security key to the secondary cell group; and the like.

An operation of a terminal proposed in the disclosure allows an operation in a case where an RRC reconfiguration message is received to be specified for a terminal supporting MR-DC, and thus it is possible to organize the operation of the terminal relating to configuration of a secondary cell group, activation of random access, a method for generating an RRC complete message, a method for delivering the same, a method for applying a security key, and the like.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1IB illustrates a block diagram of a configuration of an electronic device for supporting legacy network communication and 5G network communication according to an embodiment;

FIG. 1O illustrates a view for explaining bandwidth adaptation technology according to various embodiments;

FIG. 1Q illustrates a diagram of another example of an SS/PBCH block according to an embodiment;

DETAILED DESCRIPTION

Figure 1A:
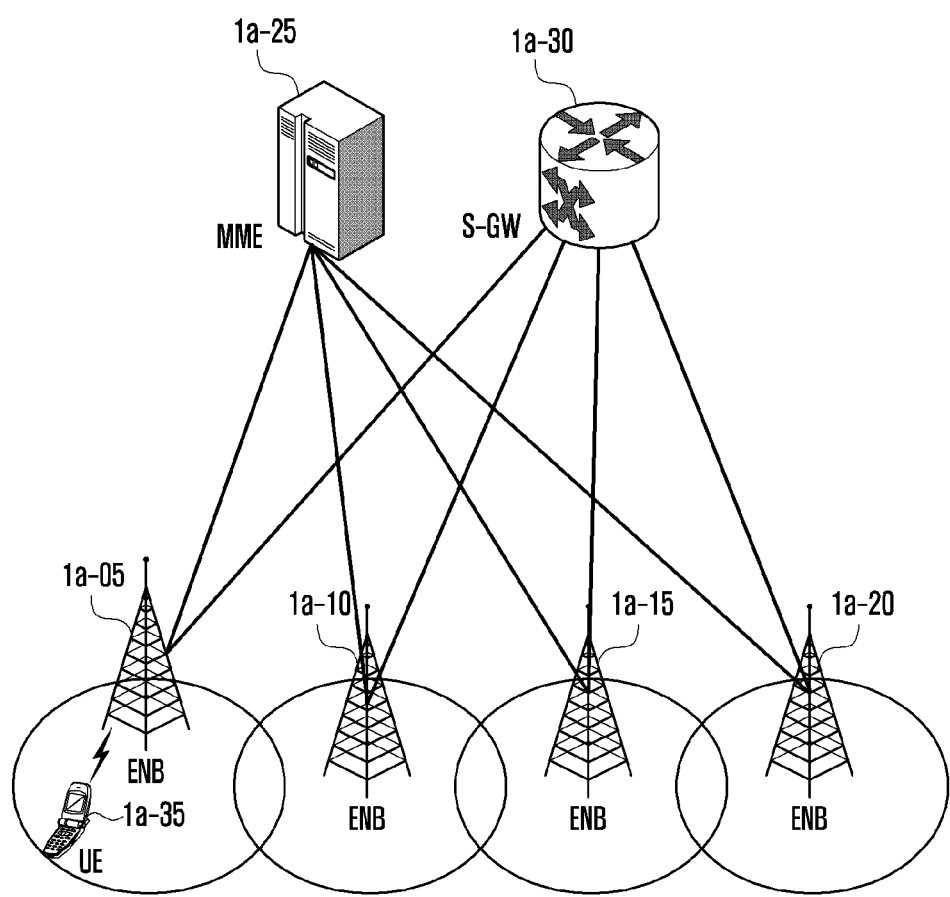
FIG. 1A illustrates a view of an architecture of a long-term evolution (LTE) system to which reference is made for description of the disclosure.
Figure 1B:
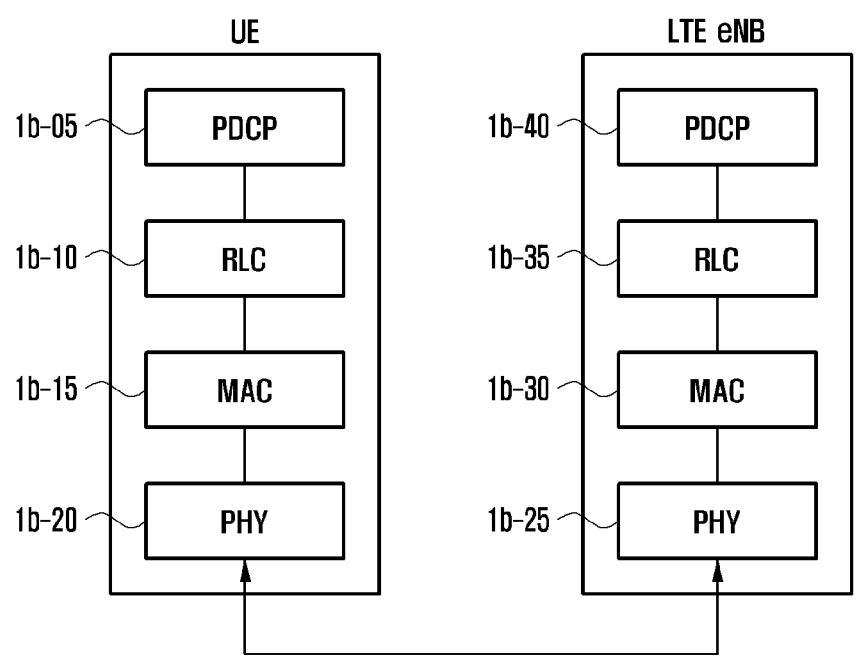
FIG. 1B illustrates a block diagram of a structure of a wireless protocol in an LTE system to which reference is made for description of the disclosure.
Figure 1C:
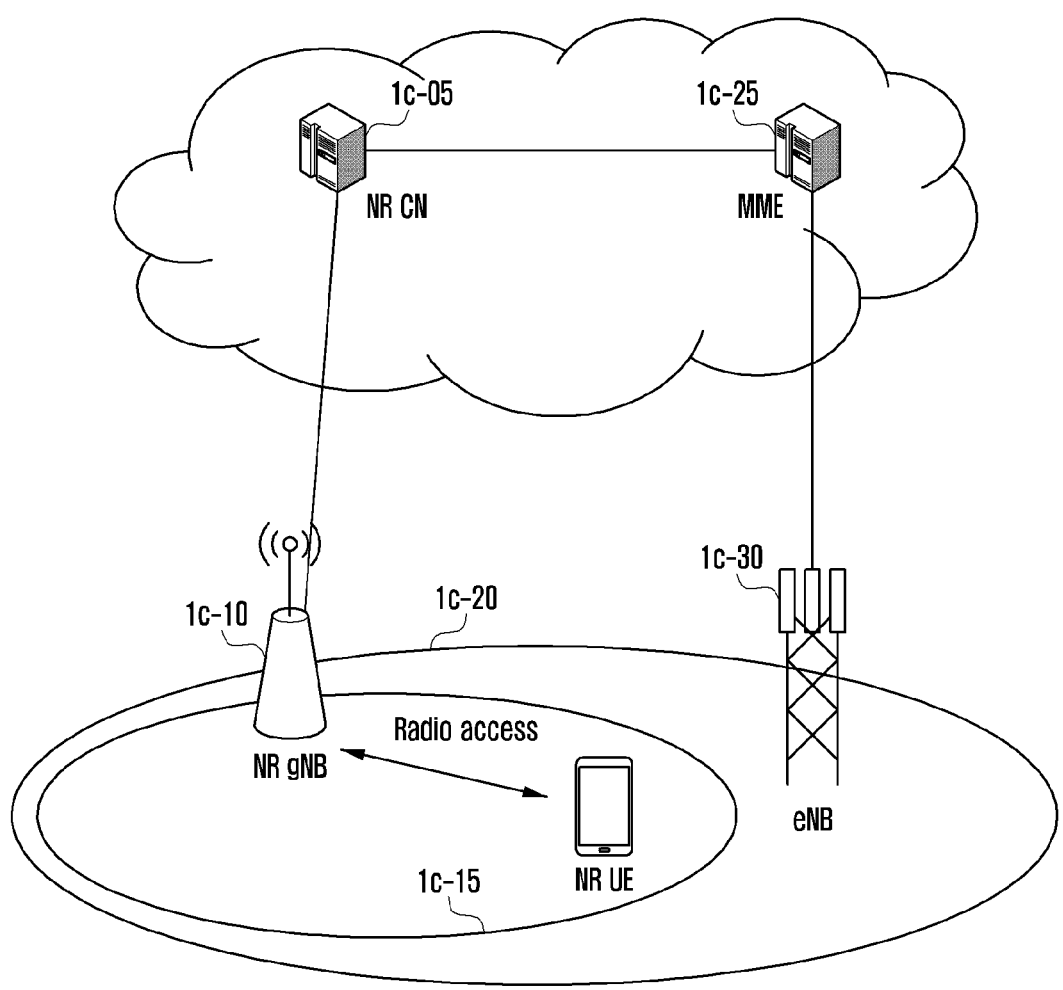
FIG. 1C illustrates a view of an architecture of a next-generation mobile communication system to which the disclosure is applied.
Figure 1D:
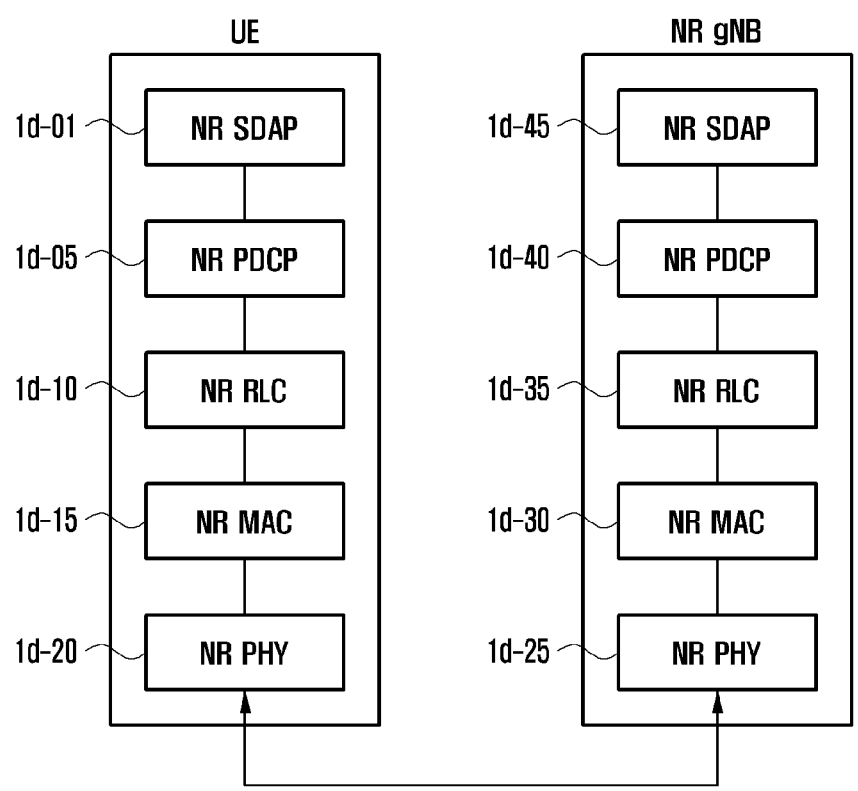
FIG. 1D illustrates a block diagram of a structure of a wireless protocol of a next-generation mobile communication system to which the disclosure may be applied.
Figure 1E:
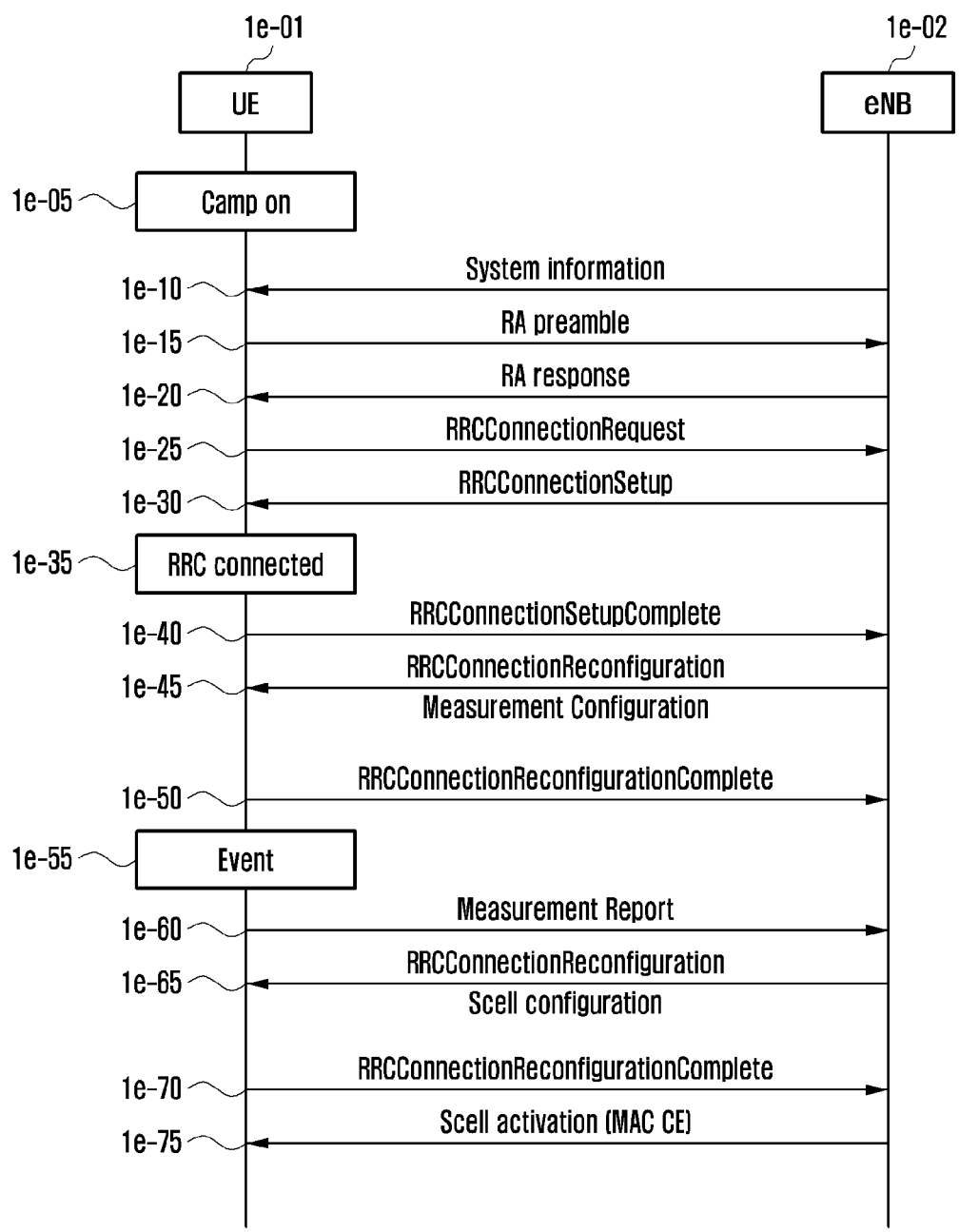
FIG. 1E illustrates a signal flow diagram of an overall operation when a terminal transitions to a connected state and performs measurement of a neighboring cell and carrier aggregation in an LTE system to which the disclosure makes reference.
Figure 1F:
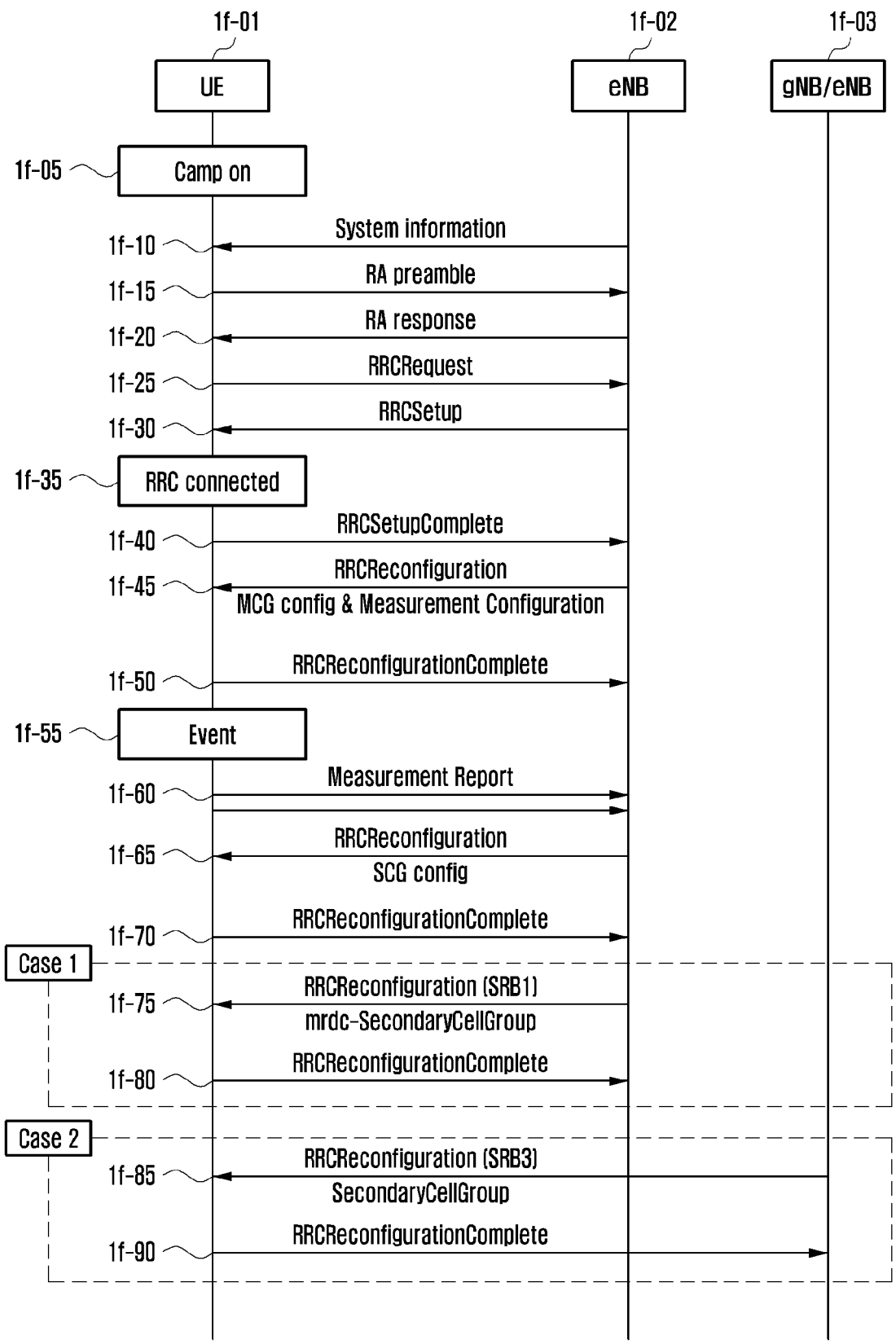
FIG. 1F illustrates a signal flow diagram of an overall operation when after transitioning to an RRC-connected state, a terminal receives configuration of a secondary cell group and responds to reception of the configuration via MR-DC in an NR system to which the disclosure makes reference and is applied.
Figure 1G:
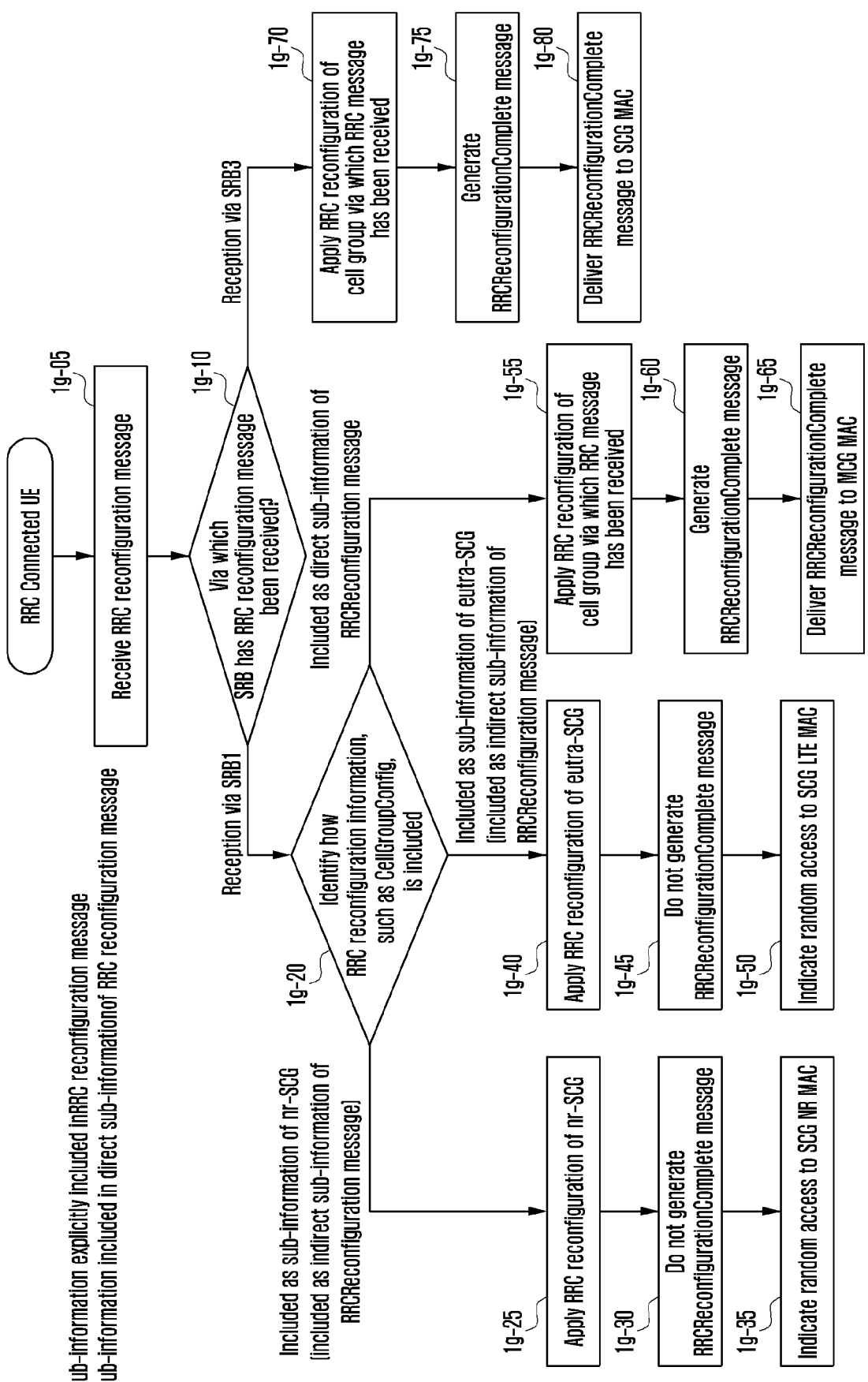
FIG. 1G illustrates a flowchart for explaining an operation of a terminal having received RRC reconfiguration information including cell group configuration information for MR-DC, as Embodiment 1 proposed in the disclosure.
Figure 1H:
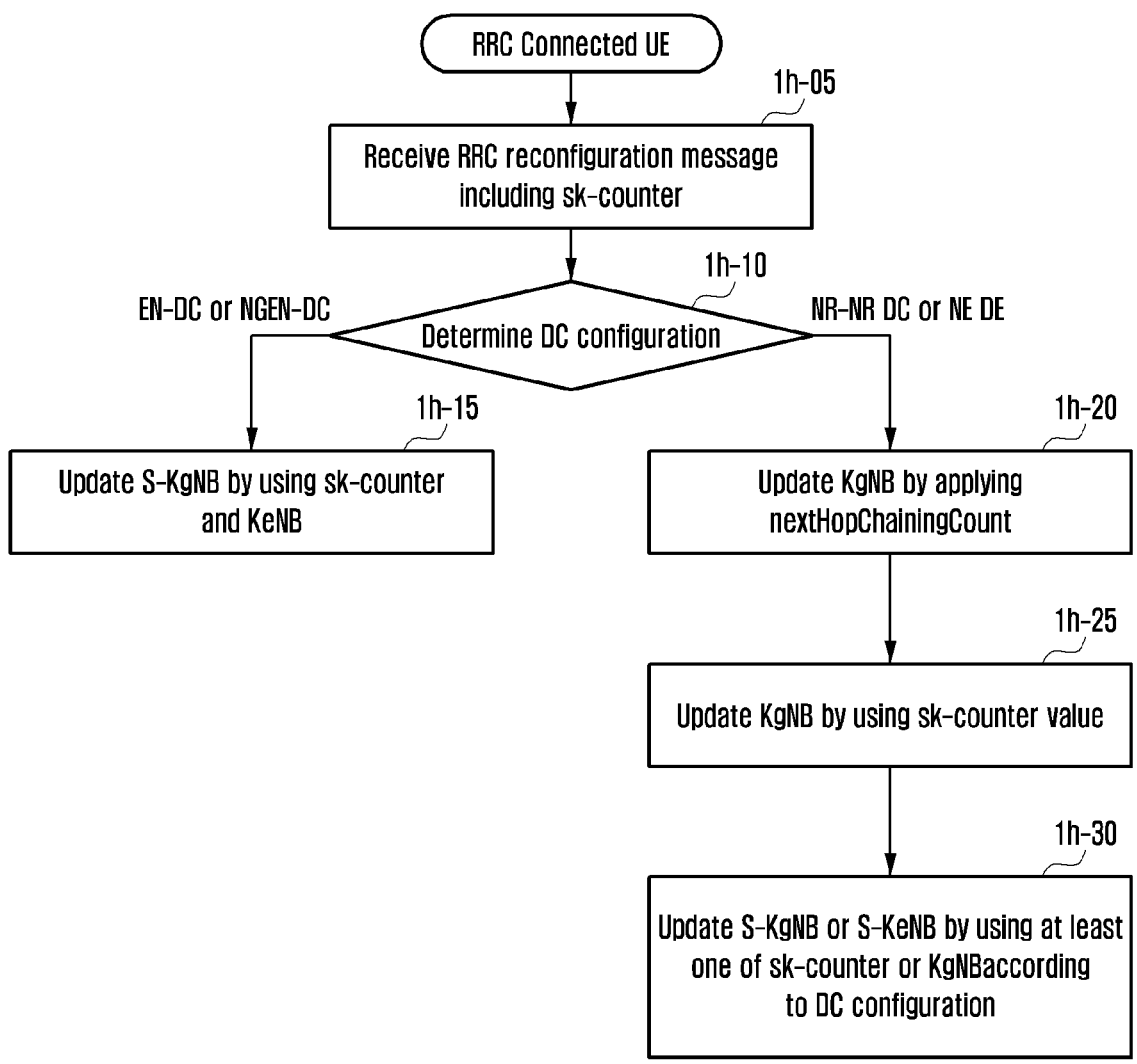
FIG. 1H illustrates a flowchart for explaining an operation of a terminal when cell group configuration information for MR-DC includes encryption-related key information, as Embodiment 1 proposed in the disclosure.
Figure 1I:
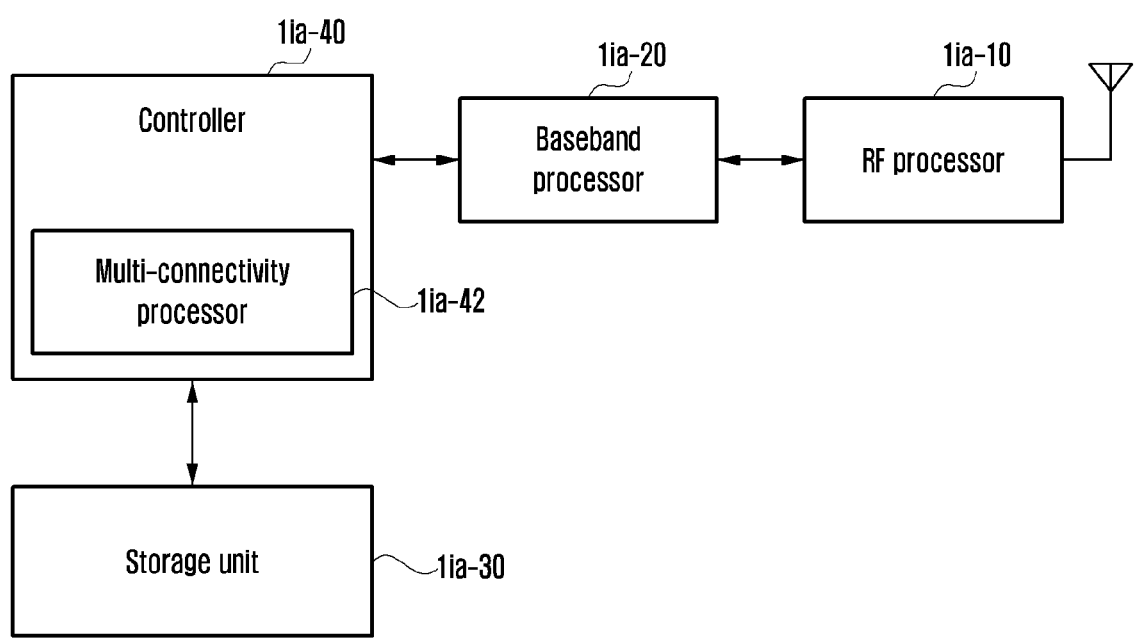
FIG. 1IA illustrates a block diagram of an internal configuration of a terminal to which the disclosure is applied.
Figure 1I:
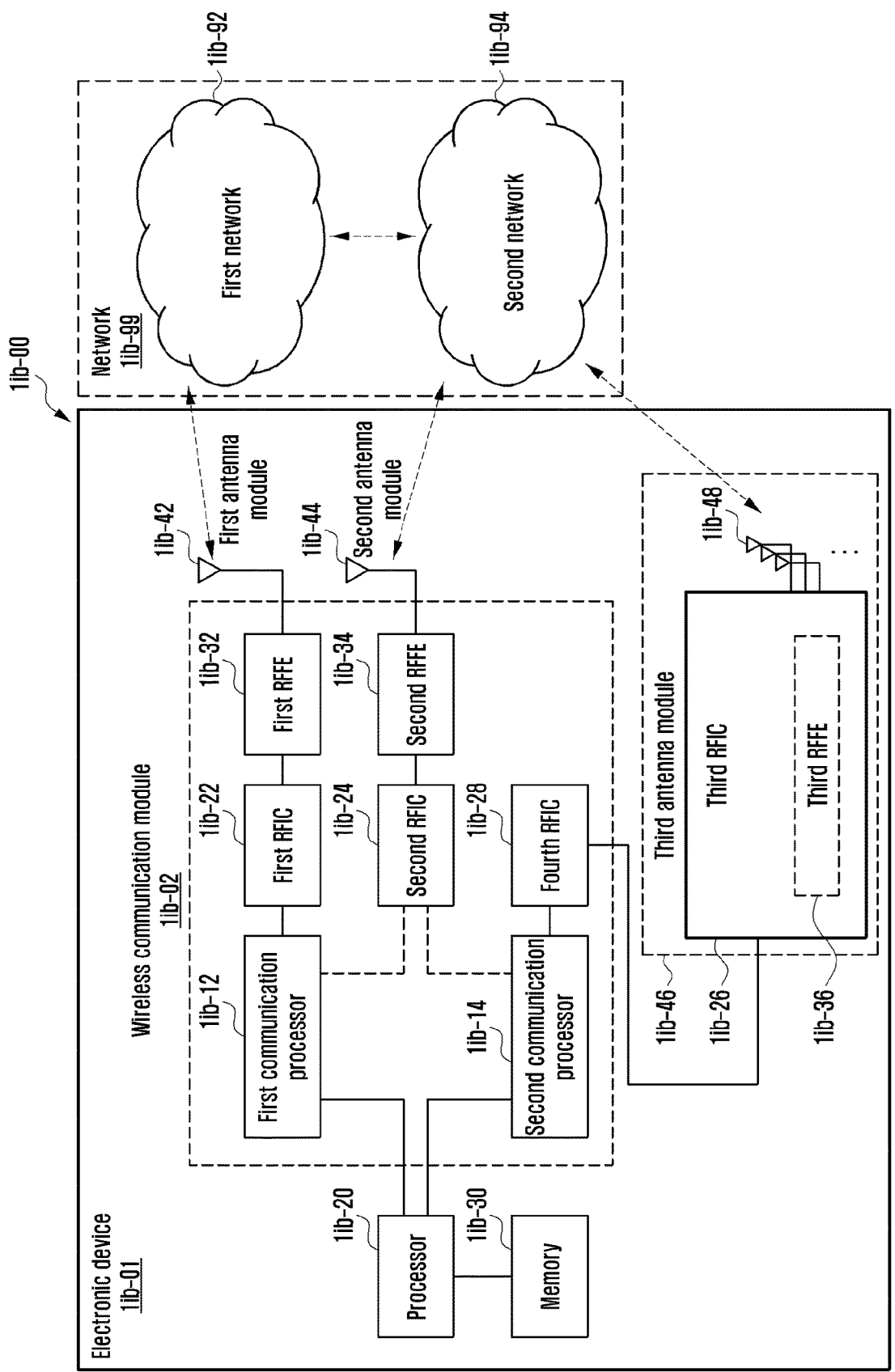
Figure 1J:
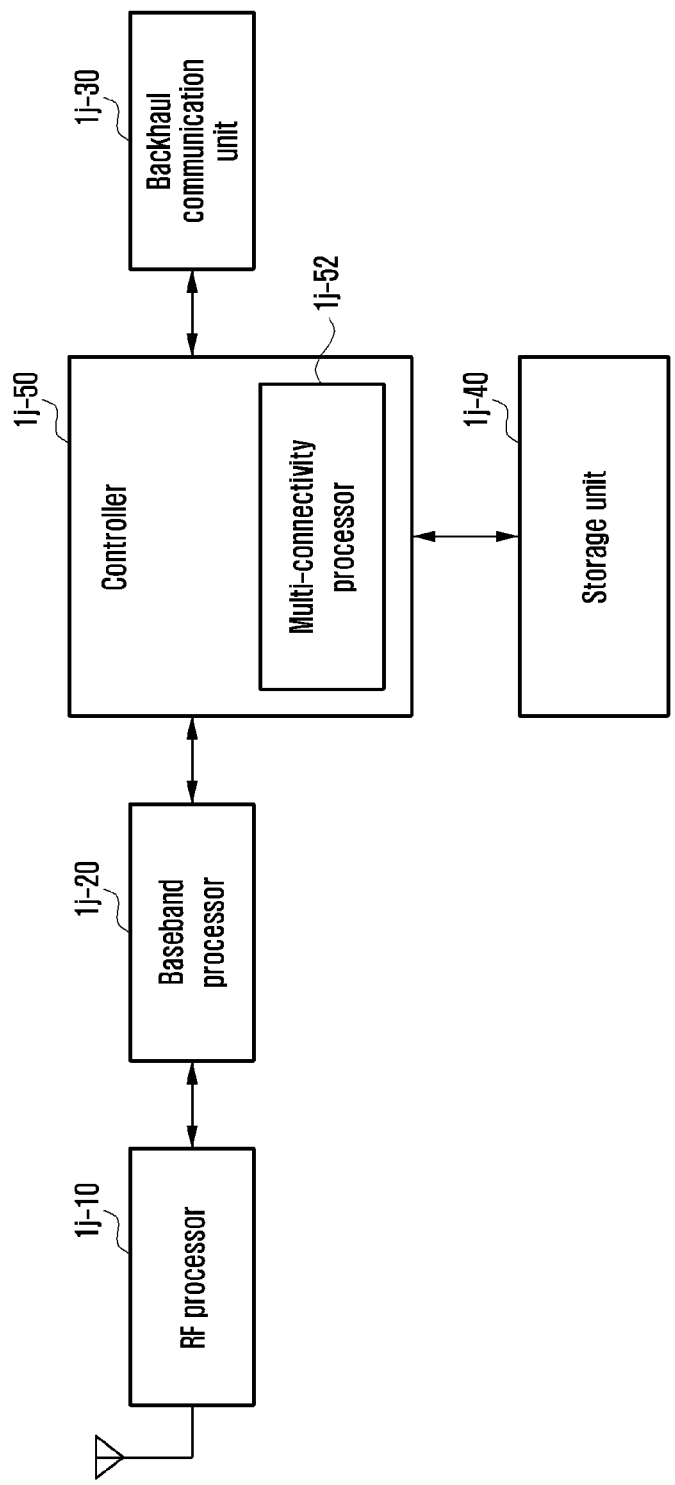
FIG. 1J illustrates a block diagram of a configuration of a base station according to the disclosure.
Figure 1K:
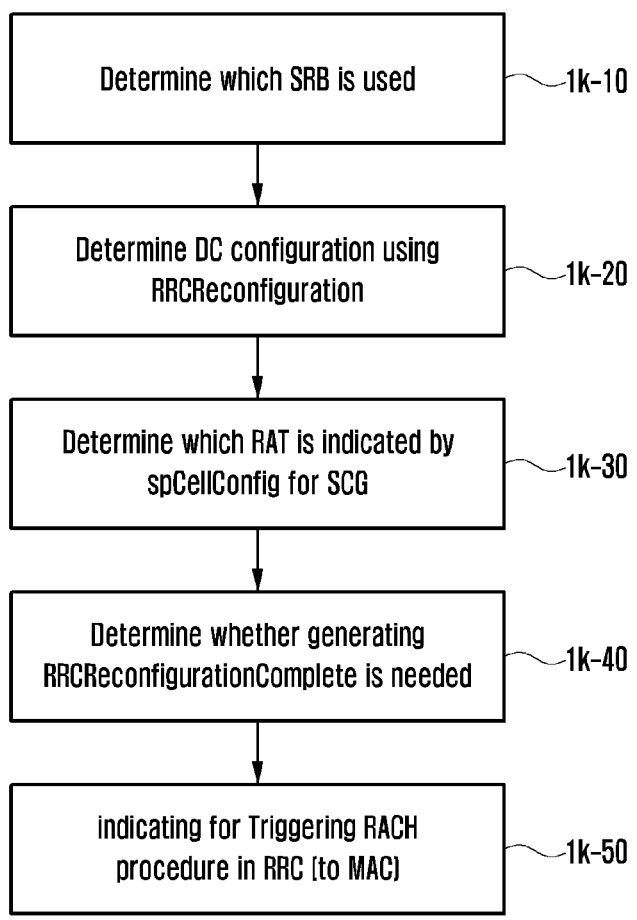
FIG. 1K illustrates a flowchart for explaining an operation of a terminal having received RRC reconfiguration information including cell group configuration information for MR-DC according to Embodiment 2 proposed in the disclosure.
Figure 1L:
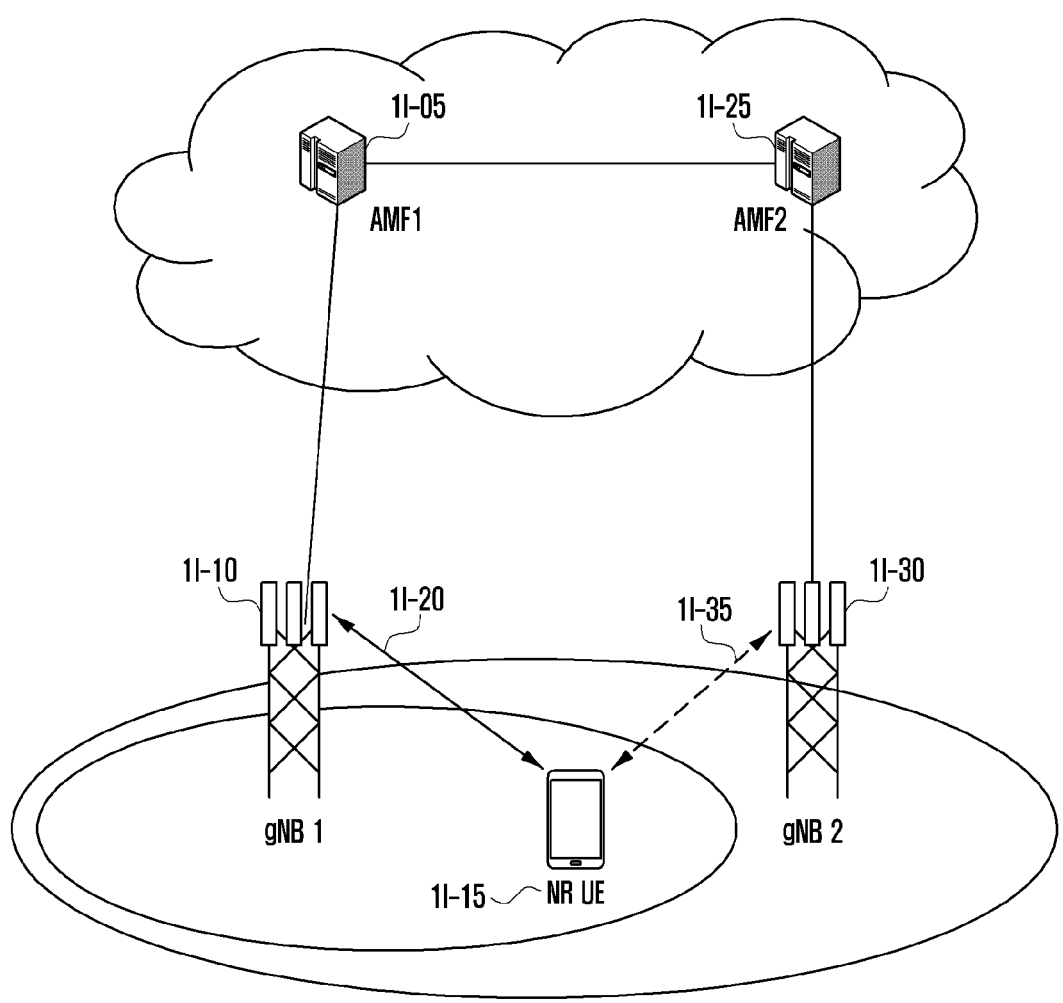
FIG. 1L illustrates a view of an architecture of a next-generation mobile communication system to which the disclosure is applied.
Figure 1M:
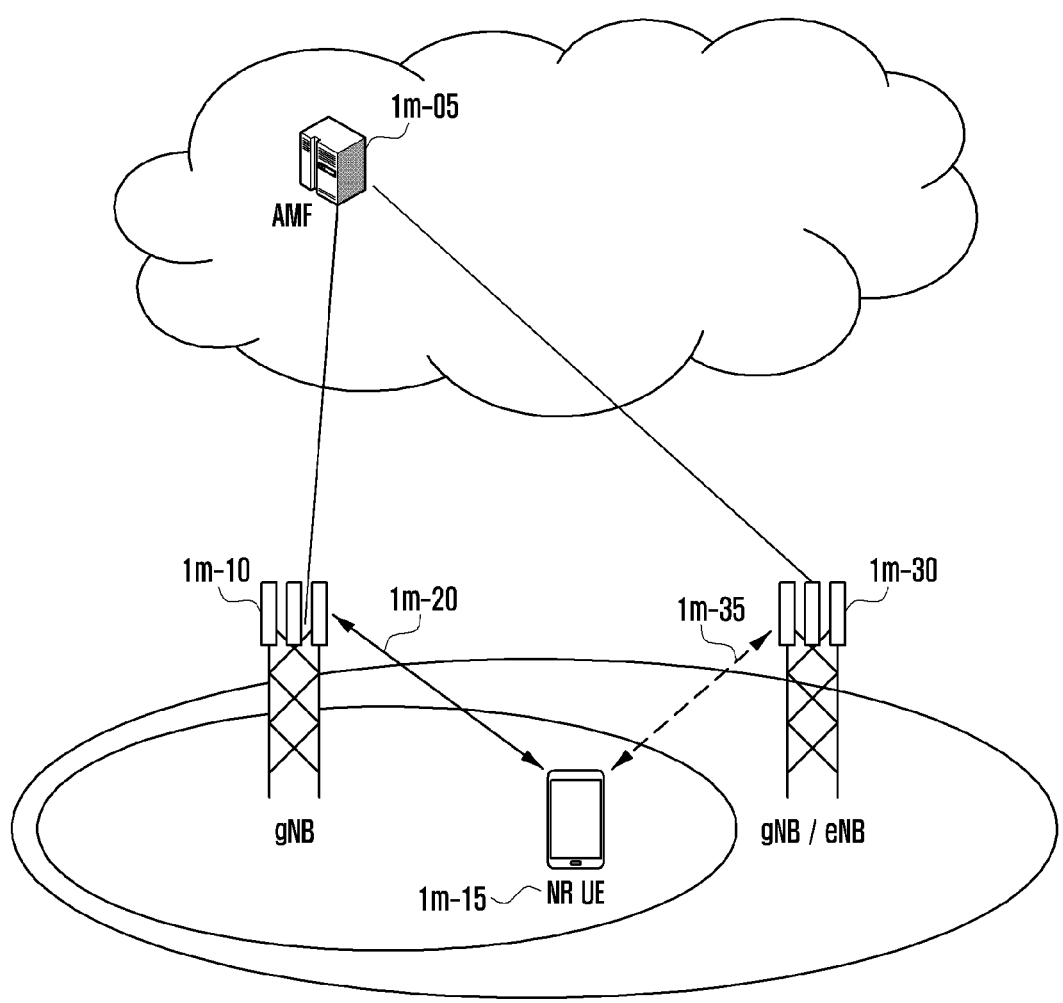
FIG. 1M illustrates a view of an architecture of a next-generation mobile communication system to which the disclosure is applied.
Figure 1N:
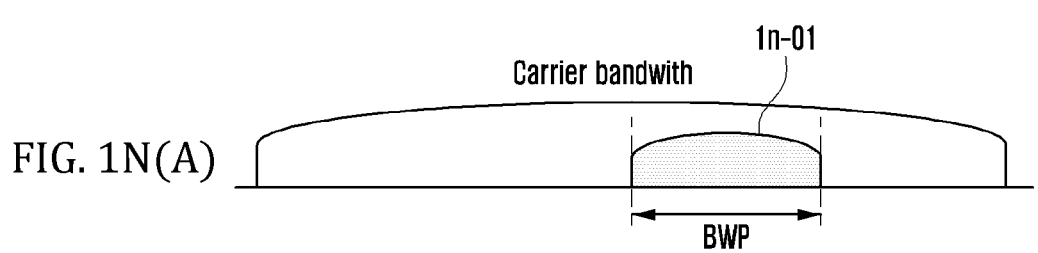
FIG. 1N(A) illustrates a view for explaining bandwidth adaptation technology according to various embodiments, FIG. 1N(B) illustrates a view for explaining bandwidth adaptation technology according to various embodiments, and FIG. 1N(C) illustrates a view for explaining bandwidth adaptation technology according to various embodiments.
Figure 1N:
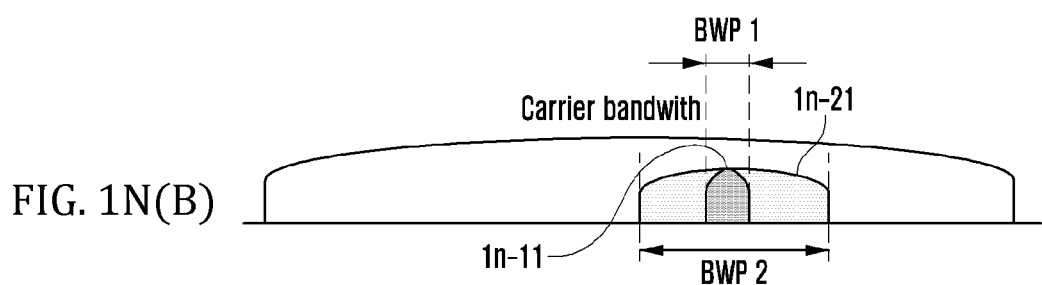
Figure 1N:
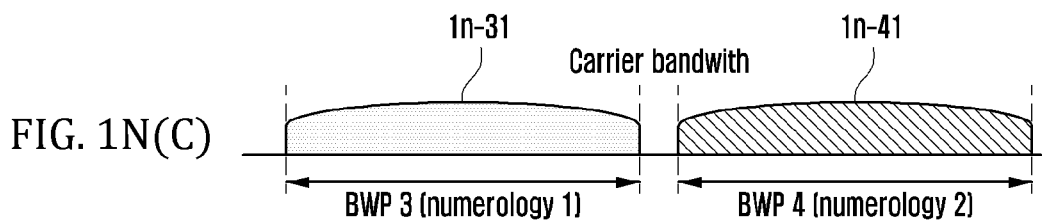
Figure 10:
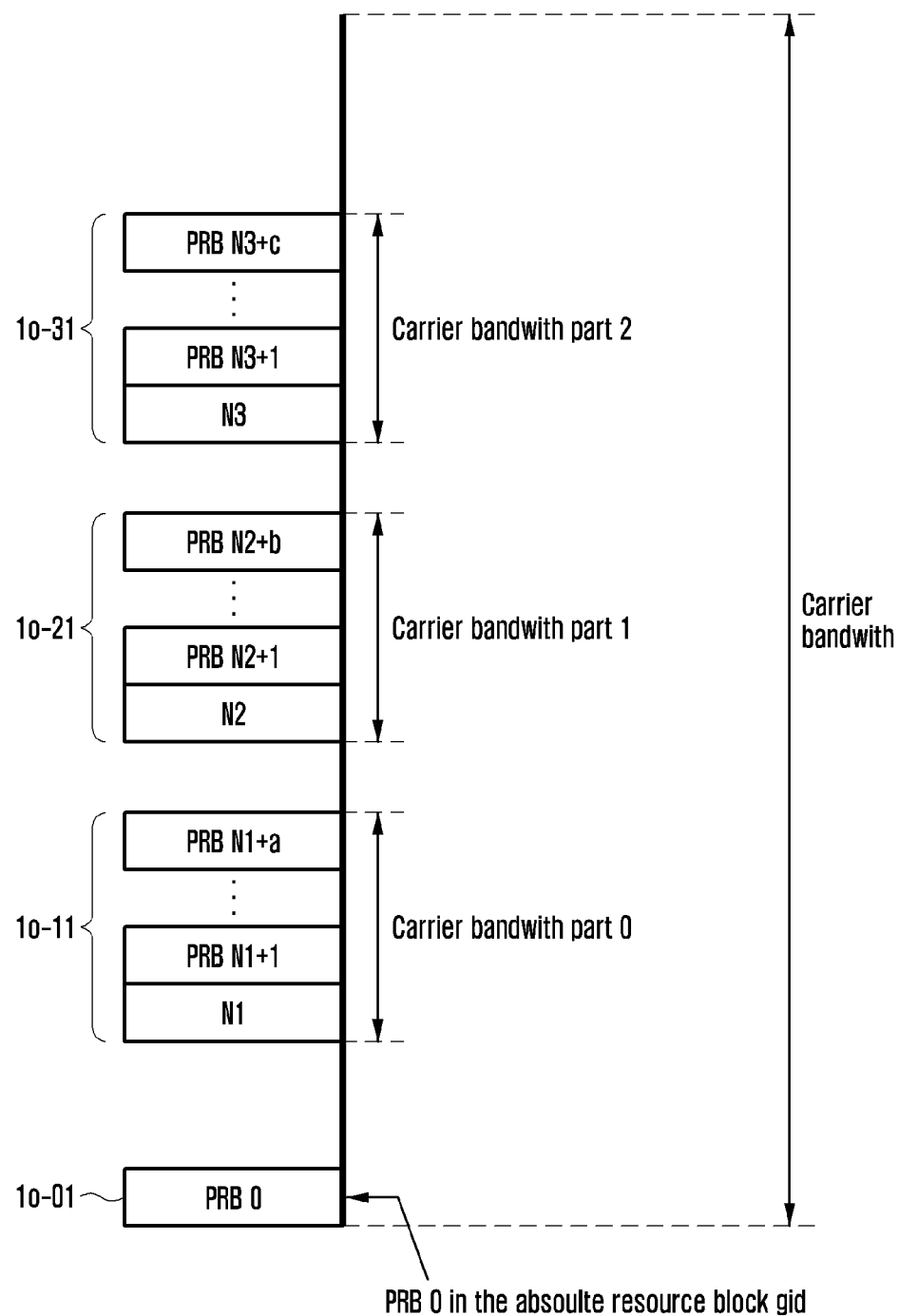
Figure 1P:
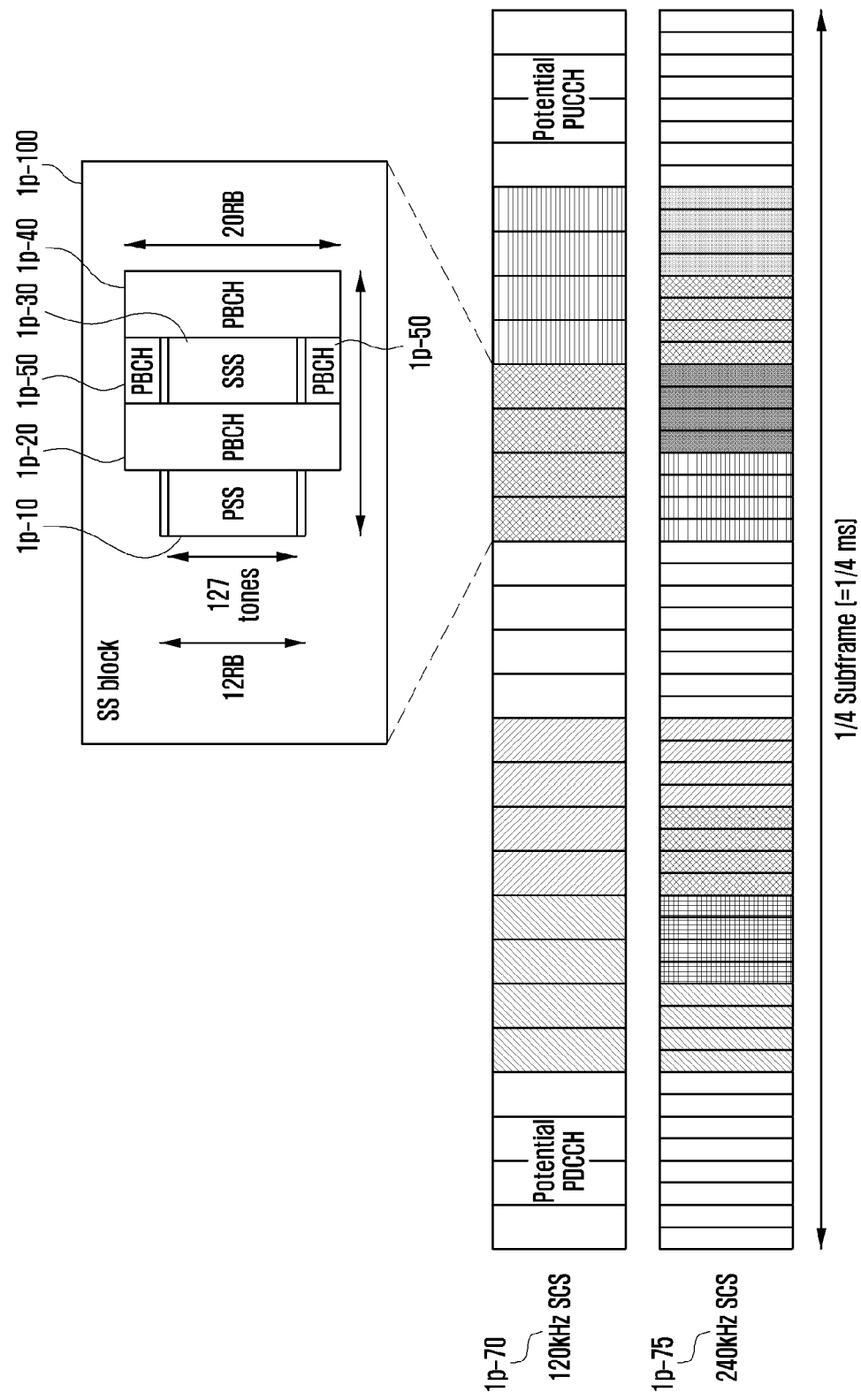
FIG. 1P illustrates a diagram of an example of an SS/PBCH block according to an embodiment.
Figure 1R:
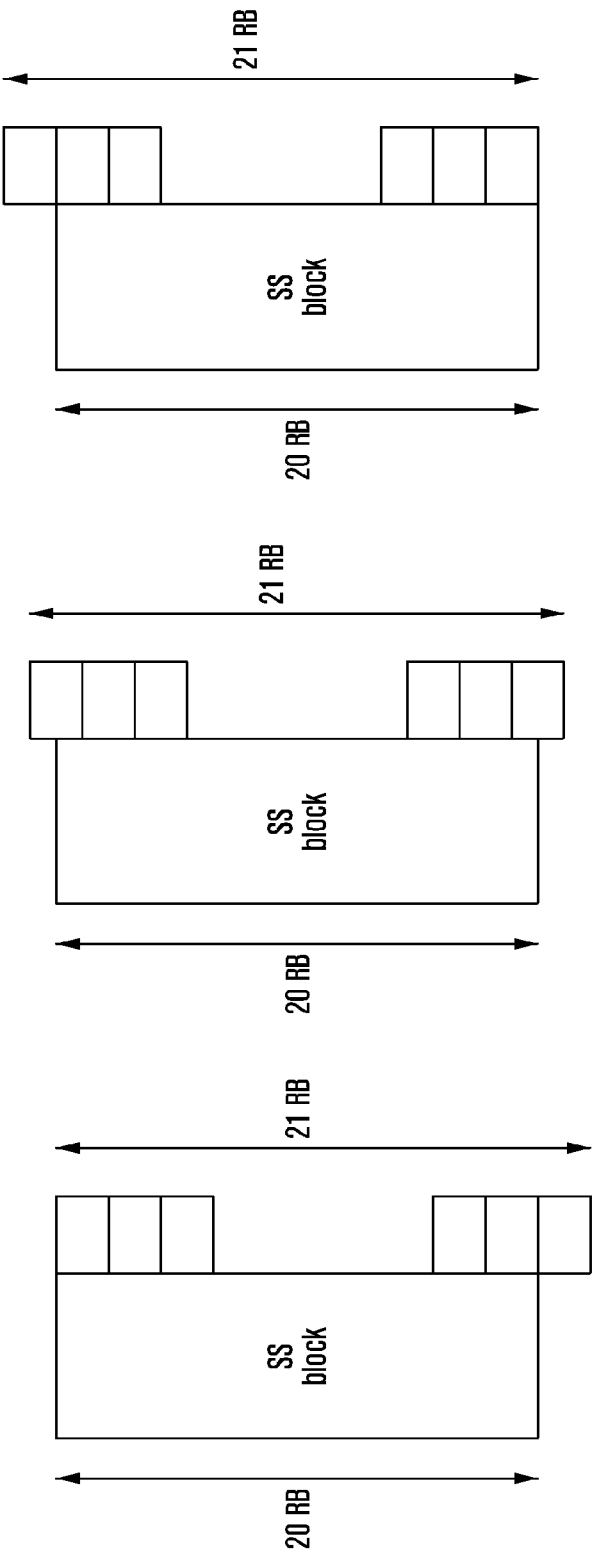
FIG. 1R illustrates a diagram of an example of a method for transmitting an SS/PBCH block.
Figure 1S:
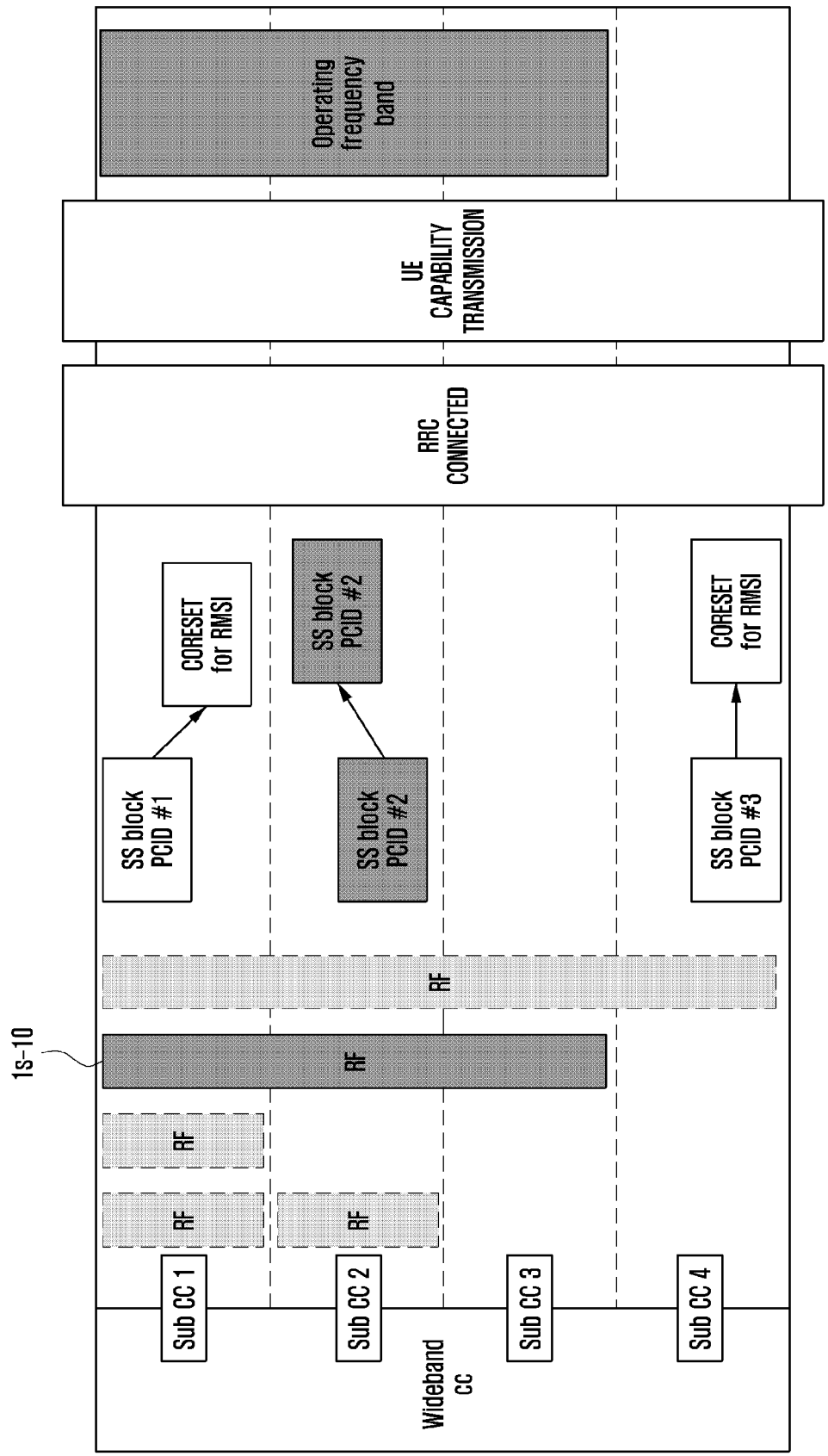
FIG. 1S illustrates a diagram of a frame structure according to an embodiment.
Figure 1T:
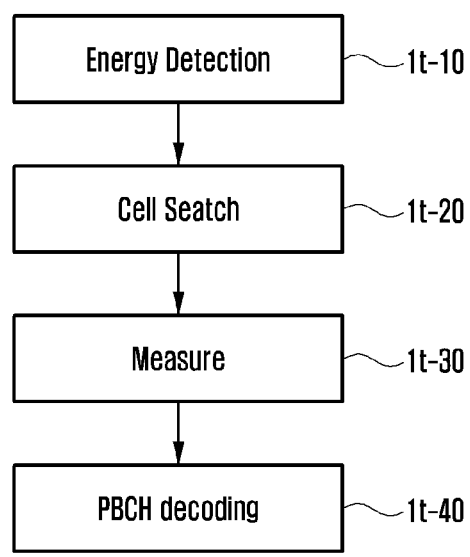
FIG. 1T illustrates a flowchart of an example of an initial access procedure according to an embodiment.

FIGS. 1A through 1T, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards.

FIG. 1A illustrates a view of an architecture of an LTE system to which reference is made for description of the disclosure.

Referring to FIG. 1A, a radio access network of the LTE system includes next-generation base stations (evolved node Bs, hereinafter "eNBs", "Node Bs", or "base stations") 1a-05, 1a-10, 1a-15, and 1a-20, a mobility management entity (MME) 1a-25, and a serving-gateway (S-GW) 1a-30. A user equipment (hereinafter "UE" or "terminal") 1a-35 accesses an external network via the eNBs 1a-05 to 1a-20 and the S-GW 1a-30.

In FIG. 1A, the eNBs 1a-05, 1a-10, 1a-15, and 1a-20 correspond to existing Node Bs of a universal mobile telecommunications system (UMTS) system. The eNBs 1a-05, 1a-10, 1a-15, and 1a-20 are connected to the UE 1a-35 via wireless channels, and perform more complex functions than those performed by existing Node Bs. In the LTE system, all user traffics including real-time services, such as voice over IP (VoIP) services through an Internet protocol, are served via shared channels. Therefore, there is a need for an apparatus configured to collect pieces of state information, such as buffer states, available transmission power states, and channel states of UEs so as to perform scheduling. Each of the eNBs 1a-05, 1a-10, 1a-15, and 1a-20 serves as the apparatus. In general, one eNB controls multiple cells. For example, in order to achieve a transfer rate of 100 Mbps, in a 20 MHz bandwidth, the LTE system employs an orthogonal frequency-division multiplexing (hereinafter, "OFDM") scheme as radio access technology. Further, the eNBs 1a-05 to 1a-20 employ an adaptive modulation and coding (hereinafter, "AMC") scheme for determining a modulation scheme and a channel coding rate so as to match a channel state of the UE 1a-35. The S-GW 1a-30 is an apparatus configured to provide data bearers, and establishes or releases data bearers under the control of the MME 1a-25. The MME 1a-25 is an apparatus configured to perform various control functions including a mobility management function for UEs, and is connected to multiple eNBs.

FIG. 1B illustrates a block diagram of a structure of a wireless protocol in an LTE system to which reference is made for description of the disclosure.

Referring to FIG. 1B, the wireless protocol of the LTE system includes packet data convergence protocols (PDCPs) 1b-05 and 1b-40, radio link controls (hereinafter, "RLCs") 1b-10 and 1b-35, and medium access controls (hereinafter, "MACs") 1b-15 and 1b-30 in a terminal and an eNB, respectively. The PDCPs 1b-05 and 1b-40 take charge of operations, such as compression/recovery of an IP header. The main functions of the PDCPs 1b-05 and 1b-40 are summarized as follows:

Function of compressing and decompressing a header (Header compression and decompression: ROHC only);
Function of transmitting user data;
Sequential delivery function (In-sequence delivery of upper layer PDUs at PDCP re-establishment procedure for RLC AM);
Reordering function (For split bearers in DC (only support for RLC AM): PDCP PDU routing for transmission and PDCP PDU reordering for reception);
Duplicate detection function (Duplicate detection of lower layer SDUs at PDCP re-establishment procedure for RLC AM);
Retransmission function (Retransmission of PDCP SDUs at handover and, for split bearers in DC, of PDCP PDUs at PDCP data-recovery procedure, for RLC AM);
Function for encryption and decryption (Ciphering and deciphering); and
Timer-based SDU discard function (Timer-based SDU discard in uplink).

The RLCs 1b-10 and 1b-35 reconfigure a PDCP protocol data unit (PDU) to a suitable size so as to perform an automatic repeat request (ARQ) operation and the like. The main functions of the RLCs 1b-10 and 1b-35 are summarized as follows:

Data transmission function (Transfer of upper layer PDUs);
ARQ function (Error correction through ARQ (only for AM data transfer));
Function for concatenation, segmentation, and reassembly (Concatenation, segmentation, and reassembly of RLC SDUs (only for UM and AM data transfer));
Re-segmentation function (Re-segmentation of RLC data PDUs (only for AM data transfer));
Reordering function (Reordering of RLC data PDUs (only for UM and AM data transfer));
Duplicate detection function (Duplicate detection (only for UM and AM data transfer));
Error detection function (Protocol error detection (only for AM data transfer));
RLC SDU discard function (RLC SDU discard (only for UM and AM data transfer)); and
RLC re-establishment function (RLC re-establishment).

The MACs 1b-15 and 1b-30 are connected to multiple RLC layer devices configured in one terminal, and multiplex RLC PDUs into MAC PDUs and demultiplex RLC PDUs from MAC PDUs. The main functions of the MACs 1b-15 and 1b-30 are summarized as follows:

Mapping function (Mapping between logical channels and transport channels);
Function for multiplexing and demultiplexing (Multiplexing/demultiplexing of MAC SDUs belonging to one or different logical channels into/from transport blocks (TBs) delivered to/from the physical layer on transport channels);
Function of reporting scheduling information;
HARQ function (Error correction through HARQ);
Function of adjusting a priority between local channels (Priority handling between logical channels of one UE);
Function of adjusting a priority between terminals (Priority handling between UEs by means of dynamic scheduling);
Function of identifying an MBMS service (MBMS service identification);
Function of selecting a transmission format (Transport format selection); and
Padding function (Padding).

The PHY layers 1b-20 and 1b-25 channel-code and modulate higher layer data into OFDM symbols and transmit the OFDM symbols via a wireless channel, or demodulate and channel-decode OFDM symbols, received via a wireless channel, into higher layer data and deliver the higher layer data to a higher layer. Further, even the physical layer uses a hybrid ARQ (HARQ) for additional error correction, and a receiving end assigns one bit to transmission of information indicating whether a packet transmitted by a transmitting end is received. This is called "HARQ ACK/NACK information". Downlink HARQ ACK/NACK information on uplink transmission may be transmitted via a physical hybrid-ARQ indicator channel (PHICH) physical channel, and uplink HARQ ACK/NACK information on downlink transmission may be transmitted via a physical uplink control channel (PUCCH) or physical uplink shared channel (PUSCH) physical channel.

The PHY layer may include one or more frequencies/carriers, and technology for simultaneously configuring multiple frequencies and using the simultaneously-configured frequencies is referred to as "carrier aggregation (hereinafter, "CA") technology". Unlike using only one carrier for communication between a terminal (or a UE) and a base station (or an E-UTRAN NodeB or eNB), the CA technology uses one or more subcarriers in addition to a main carrier so as to make it possible to dramatically increase transmission capacity by as many as the number of subcarriers. In the LTE, a cell within the base station using the main carrier is referred to as a "primary cell (PCell)" and the subcarrier is referred to as a "secondary cell (SCell)".

Although not illustrated in the drawings, a radio resource control (hereinafter, "RRC") layer exists above the PDCP layer of each of the terminal and the base station, and the RRC layer exchanges access and measurement-related configuration control messages for radio resource control.

FIG. 1C illustrates a view of an architecture of a next-generation mobile communication system to which the disclosure is applied.

Referring to FIG. 1C, a radio access network of the next-generation mobile communication system includes a next-generation base station (a New Radio (NR) Node B, hereinafter "NR NB") 1c-10 and a new radio core network (NR CN) or a next-generation core network (NG CN) 1c-05. A New Radio user equipment (hereinafter "NR UE" or "terminal") 1c-15 accesses an external network via the NR NB 1c-10 and the NR CN 1c-05.

In FIG. 1C, the NR NB 1c-10 corresponds to an evolved Node B (eNB) of the existing LTE system. The NR NB 1c-10 is connected to the NR UE 1c-15 via a wireless channel, and may provide a service superior to that provided by the existing Node B. In the next-generation mobile communication system, all user traffics are served via shared channels. Therefore, there is a need for an apparatus configured to collect pieces of state information, including buffer states, available transmission power states, channel states, and the like of UEs so as to perform scheduling, and the NR NB 1c-10 serves as the apparatus. In general, one NR NB controls multiple cells. In order to achieve ultra-high-speed data transmission in comparison to the existing LTE, the next-generation mobile communication system may have an existing maximum bandwidth or larger and may use an OFDM scheme as radio access technology, and beam-forming technology may be combined with the next-generation mobile communication system in addition to the OFDM scheme. Further, an adaptive modulation and coding (hereinafter, "AMC") scheme for determining a modulation scheme and a channel coding rate so as to match a channel state of a terminal is applied to the next-generation mobile communication system. The NR CN 1c-05 performs functions, including mobility support, bearer establishment, quality of service (QoS) configuration, and the like. The NR CN 1c-05 is an apparatus configured to perform various control functions including a mobility management function for a terminal, and is connected to multiple base stations. Further, the next-generation mobile communication system may interwork with the existing LTE system, and the NR CN 1c-05 is connected to an MME 1c-25 of the LTE system via a network interface. The MME 1c-25 is connected to an eNB 1c-30 which is an existing base station.

FIG. 1D illustrates a block diagram of a structure of a wireless protocol of a next-generation mobile communication system to which the disclosure may be applied.

Referring to FIG. 1D, the wireless protocol of the next-generation mobile communication system includes NR service data adaptation protocols (SDAPs) 1d-01 and 1d-45, NR PDCPs 1d-05 and 1d-40, NR RLCs 1d-10 and 1d-35, and NR MACs 1d-15 and 1d-30 in a terminal and an NR base station, respectively.

The main functions of the NR SDAPs 1d-01 and 1d-45 may include some of the following functions:
  Function of delivering user data (Transfer of user plane data);
  Function of mapping between a QoS flow and a data bearer for both uplink and downlink (Mapping between a QoS flow and a data radio bearer (DRB) for both DL and UL);
  Function of marking a QoS flow ID for both uplink and downlink (Marking QoS flow ID in both DL and UL packets); and
  Function of mapping a reflective QoS flow to a data bearer for uplink SDAP PDUs (Reflective QoS flow to DRB mapping for the UL SDAP PDUs).

In relation to an SDAP layer device, a terminal may receive a radio resource control (RRC) message including configuration as to whether to use a header or function of the SDAP layer device for each PDCP layer device, bearer, or local channel. If an SDAP header is configured, via a one-bit non-access stratum (NAS) reflective QoS indicator of the SDAP header and a one-bit access stratum (AS) reflective QoS indicator thereof, the terminal may be instructed to update or reconfigure information on mapping between a QoS flow of an uplink and a downlink and a data bearer. The SDAP header may include QoS flow ID information which indicates QoS. QoS information may be used as data processing priority information, scheduling information, and the like for supporting a smooth service.

The main functions of the NR PDCPs 1d-05 and 1d-40 may include some of the following functions:
  Function of compressing and decompressing a header (Header compression and decompression: ROHC only);
  Function of transmitting user data (Transfer of user data);
  Sequential delivery function (In-sequence delivery of upper layer PDUs);
  Non-sequential delivery function (Out-of-sequence delivery of upper layer PDUs);
  Reordering function (PDCP PDU reordering for reception);
  Duplicate detection function (Duplicate detection of lower layer SDUs);
  Retransmission function (Retransmission of PDCP SDUs);
  Function for encryption and decryption (Ciphering and deciphering); and
  Timer-based SDU discard function (Timer-based SDU discard in uplink).

In the above description, the reordering function of the NR PDCPs 1d-05 and 1d-40 refers to a function of rearranging PDCP PDUs, received in a lower layer, in order on the basis of a PDCP sequence number (SN). The reordering function of the NR PDCPs 1d-05 and 1d-40 may include: a function of delivering data to a higher layer in the rearranged order; a function of directly delivering data without considering an order; a function of recording PDCP PDUs lost by rearranging an order; a function of reporting a state of the lost PDCP PDUs to a transmission side; and a function of requesting the retransmission of the lost PDCP PDUs.

The main functions of the NR RLCs 1d-10 and 1d-35 may include some of the following functions:

Data transmission function (Transfer of upper layer PDUs);
Sequential delivery function (In-sequence delivery of upper layer PDUs);
Non-sequential delivery function (Out-of-sequence delivery of upper layer PDUs);
ARQ function (Error Correction through ARQ);
Function for concatenation, segmentation, and reassembly (Concatenation, segmentation and reassembly of RLC SDUs);
Re-segmentation function (Re-segmentation of RLC data PDUs);
Reordering function (Reordering of RLC data PDUs);
Duplicate detection function (Duplicate detection);
Error detection function (Protocol error detection);
RLC SDU discard function (RLC SDU discard); and
RLC re-establishment function (RLC re-establishment).

In the above description, the in-sequence delivery function of the NR RLC device refers to a function of delivering RLC SDUs received from a lower layer to a higher layer in order. If multiple RLC SDUs divided from a single original RLC SDU are received, the in-sequence delivery function of the NR RLC device may include a function of reassembling and delivering the received multiple RLC SDUs. The in-sequence delivery function of the NR RLC device may include: a function of rearranging the received RLC PDUs in order with reference to an RLC SN or a PDCP SN; a function of recording RLC PDUs lost by rearranging an order; a function of reporting a state of the lost RLC PDUs to a transmission side; and a function of requesting the retransmission of the lost RLC PDUs. The in-sequence delivery function of the NR RLC device may include a function of delivering only the RLC SDUs before the lost RLC SDU to the higher layer in order if there is the lost RLC SDU. Alternatively, the in-sequence delivery function of the NR RLC device may include a function of delivering all the received RLC SDUs to the higher layer in order before a predetermined timer starts if the predetermined timer expires although there is the lost RLC SDU. Alternatively, the in-sequence delivery function of the NR RLC device may include a function of delivering all the RLC SDUs received until now to the higher layer in order if the predetermined timer expires although there is the lost RLC SDU. Further, in the above description, the NR RLC device may process RLC PDUs in the order of reception of the RLC PDUs (in the arrival order of the RLC PDUs regardless of the order of sequence numbers), and may deliver, out-of-sequence delivery, the processed RLC PDUs to the PDCP device. If the NR RLC device is to receive a segment, the NR RLC device may receive the segments stored in a buffer or to be later received, may reconfigure the RLC PDUs into one complete RLC PDU, and may then deliver the complete RLC PDU to the PDCP device. The NR RLC layer may not include the concatenation function, and the function may be performed in the NR MAC layer or may be replaced by the multiplexing function of the NR MAC layer.

In the above description, the out-of-sequence delivery function of the NR RLC device refers to a function of directly delivering the RLC SDUs received from the lower layer to the higher layer regardless of the order thereof. When multiple RLC SDUs divided from a single original RLC SDU are received, the out-of-sequence delivery function of the NR RLC device may include a function of reassembling and delivering the received multiple RLC SDUs. Further, the out-of-sequence delivery function of the NR RLC device may include a function of storing and reordering RLC SNs or PDCP SNs of the received RLC PDUs so as to record the lost RLC PDUs.

The NR MACs 1d-15 and 1d-30 may be connected to multiple NR RLC layer devices configured in one terminal, and the main functions of the NR MACs 1d-15 and 1d-30 may include some of the following functions:

Mapping function (Mapping between logical channels and transport channels);
Function for multiplexing and demultiplexing (Multiplexing/demultiplexing of MAC SDUs);
Function of reporting scheduling information (Scheduling information reporting);
HARQ function (Error correction through HARQ);
Function of adjusting a priority between local channels (Priority handling between logical channels of one UE);
Function of adjusting a priority between terminals (Priority handling between UEs by means of dynamic scheduling);
Function of identifying an MBMS service (MBMS service identification);
Function of selecting a transmission format (Transport format selection); and
Padding function (Padding).

The NR PHY layers 1d-20 and 1d-25 may channel-code and modulate higher layer data, may make the higher layer data into an OFDM symbol, and may transmit the same via a radio channel, or may demodulate and channel-decode the OFDM symbol, received via the radio channel, and may deliver the demodulated and channel-decoded OFDM symbol to the higher layer.

FIG. 1E illustrates a signal flow diagram of an overall operation when a terminal transitions to a connected state and performs measurement of a neighboring cell and carrier aggregation in an LTE system to which the disclosure makes reference.

A cell reselection is a procedure for determining on which cell the terminal camps when the quality of service of a serving cell is lower than the quality of service of neighboring cells due to the movement of the terminal in an idle state (which is expressed as an inactive state, a dormant mode, or the like in the disclosure). A handover determination is made by a network (MME or source eNB), whereas the terminal may determine a cell reselection based on the measured value. Further, a cell that is reselected by the terminal while the terminal moves may be a cell that uses the same LTE frequency as a serving cell that the terminal is currently camping on (intra-frequency), a cell that uses an LTE frequency different from that of the serving cell (inter-frequency), or a cell that uses other radio access technologies (inter-RAT).

The terminal 1e-01 in an idle state may perform a series of operations while camping on (in operation 1e-05) a serving cell. First, in operation 1e-10, the terminal 1e-01 may receive system information (a system information block (SIB)) broadcast by a base station of the serving cell. For reference, a master information block (MIB), SIB 1, and SIB 2 are system information commonly applied to all terminals, and SIB 3 to SIB 8 include information necessary for a terminal in an idle state to reselect a cell. In particular, information related to LTE intra-frequency neighboring cell measurement may be delivered via SIB 4, and information related to LTE inter-frequency neighboring cell measurement may be delivered via SIB 5. The system information may include a threshold used to determine whether to measure neighboring cell signals, a parameter used to calculate ranks of a serving cell and neighboring cells, and the like. Further, in the case of LTE intra-frequency neighboring cell measurement, a carrier frequency is the same as a current serving cell, and thus carrier frequency information is not separately signaled via SIB 4. However, carrier frequency information of neighboring cells required to be measured may be specified in SIB 5.

In addition, the terminal 1e-01 in an idle mode (RRC_IDLE) may find an appropriate cell and camp on (in operation 1e-05) a corresponding base station 1e-02, may receive (in operation 1e-10) system information, and may access the base station (in operation 1e-15) due to generation of data to be transmitted and the like. In the idle mode, the terminal is not connected to a network for power saving of the terminal and the like so as to be in a state where the terminal cannot transmit data, and for data transmission, the terminal may need to transition to a connected mode (RRC_CONNECTED). Also, the term "camping on" implies that the terminal stays on the corresponding cell so that the terminal is receiving a paging message in order to determine whether data is transmitted in a DL. Performing, by the terminal, a procedure for accessing a base station implies that the terminal performs a random-access procedure with the corresponding base station and cell. That is, in operation 1e-15, if the terminal successfully accesses the base station, the terminal may deliver a preamble (msg 1), and in operation 1e-20, the base station may deliver, to the terminal, a random-access response message (msg 2) to the corresponding preamble. Then, in operation 1e-25, the terminal may deliver an RRC connection request message for requesting an RRC connection (msg 3) by including a terminal ID, a connection reason, and the like in the RRC connection request message, and in operation 1e-30, the base station may deliver, to the terminal, a response message (msg 4) to the corresponding RRC connection request message. If the terminal receives an RRC connection setup message in the above operation, the terminal determines that permission for switching to an RRC-connected state has been received from the base station; and in operation 1e-40, while the terminal delivers an RRC connection setup complete message to the base station, the state of the terminal may be changed to an RRC-connected mode (RRC_CONNECTED) (in operation 1e-35), and thus the terminal in the connected mode may transmit or receive data to/from the base station.

In operation 1e-45, the base station may deliver, to the terminal, an RRC connection reconfiguration message including a measurement configuration and the like. The measurement configuration included in the message may include information on intra/inter/inter-RAT neighboring cells required to be measured, a type of a signal required to be measured, a method for reporting a measured value, and the like, which are configured. In operation 1e-50, the terminal may deliver an RRC connection reconfiguration complete message as a response to the message to the base station. If a measurement result of a particular measurement object in the configured measurement configuration satisfies a measurement condition for reporting (in operation 1e-55), in operation 1e-60, the terminal may report the corresponding measurement result to the base station according to a configured reporting scheme.

In operation 1e-65, the base station may recognize channel states of neighboring cells based on the measurement result reported by the terminal in the above operation, and may recognize cells having good channel states. In operation 1e-70, for the reason of providing the corresponding terminal with increased traffic, a better service, and the like, the base station may configure carrier aggregation (CA) for the corresponding terminal, and may configure the cells having good channel states identified in the above operation as a secondary cell (SCell) for CA. This configuration is delivered by being included in an RRC connection reconfiguration message, and in operation 1e-70, when the terminal receives the message, the terminal may deliver a response message to the base station. Then, in operation 1e-75, the base station may deliver a MAC CE for activating CA configured for a particular cell so as to activate CA.

FIG. 1F illustrates a signal flow diagram of an overall operation when after transitioning to an RRC-connected state, a terminal receives configuration of a secondary cell group and responds to reception of the configuration via MR-DC in an NR system to which the disclosure makes reference and is applied.

The terminal 1f-01 in an idle mode (RRC_IDLE) may find an appropriate cell and camp on (in operation 1f-05) a corresponding base station 1f-02, and may receive (in operation 1f-10) system information from the corresponding serving cell. Then, the terminal 1f-01 may access the base station (in operation 1f-15) due to generation of data to be transmitted and the like. In the idle mode, the terminal is not connected to a network for power saving of the terminal and the like so as to be in a state where the terminal cannot transmit data, and for data transmission, the terminal may need to transition to a connected mode (RRC_CONNECTED). Also, the term "camping on" implies that the terminal stays on the corresponding cell so that the terminal is receiving a paging message in order to determine whether data is transmitted in a DL. Performing, by the terminal, a procedure for accessing a base station implies that the terminal performs a random-access procedure with the corresponding base station and cell. That is, in operation 1f-15, if the terminal successfully accesses the base station, the terminal may deliver a preamble (msg 1); in operation 1f-20, the base station may deliver, to the terminal, a random-access response message (msg 2) to the corresponding preamble; and in operation 1f-25, the terminal may deliver an RRC connection request message for requesting an RRC connection (msg 3) by including a terminal ID, a connection reason, and the like in the RRC connection request message. Then, in operation 1f-30, the base station may deliver, to the terminal, a response message (msg 4) to the corresponding RRC connection request message. If the terminal receives an RRC connection setup message in the above operation, the terminal determines that permission for switching to an RRC-connected state has been received from the base station; and in operation 1f-40, while the terminal delivers an RRC connection setup complete message to the base station, the state of the terminal is changed to an RRC-connected mode (RRC_CONNECTED) (in operation 1f-35), and thus the terminal in the connected mode may transmit or receive data to/from the base station.

In operation 1f-45, the base station may deliver an RRC reconfiguration message including a measurement configuration and the like, to the terminal via SRB1. The measurement configuration included in the message may include information on intra/inter/inter-RAT neighboring cells required to be measured, a type of a signal required to be measured, a method for reporting a measured value, and the like, which are configured. In operation 1f-50, the terminal may deliver an RRC reconfiguration complete message as a response to the message to the base station via SRB1. If a measurement result of a particular measurement object in the configured measurement configuration satisfies a measurement condition for reporting (in operation 1f-55), in operation 1f-60, the terminal may report the corresponding measurement result to the base station according to a configured reporting scheme.

In operation 1f-65, the base station may recognize channel states of neighboring cells based on the measurement result reported by the terminal in the above operation, and may recognize cells having good channel states. In operation 1f-70, for the reason of providing the corresponding terminal with increased traffic, a better service, and the like, the base station may configure CA or dual connectivity (DC) for the corresponding terminal, and may configure a secondary cell group (SCG) and an SCell including the cells having good channel states identified in the above operation. This configuration may be delivered via SRB1 by being included in an RRC reconfiguration message, and in operation 1f-70, when the terminal receives the message, the terminal may deliver a response message to the base station via SRB1. For reference, operation 1f-65 and operation 1f-70 are omitted, and then the following operations may be performed. Then, the base station may provide the terminal with SCG-related configuration information for activation of DC. In an embodiment, in a method for configuring at least one of Evolved Universal Mobile Telecommunications System (UMTS) Terrestrial Radio Access (E-UTRA) new radio dual connectivity (EN-DC), NR-E-UTRA dual connectivity (NE-DC), or NR-NR DC, as in a method indicated by Case A, in operation 1f-75, an RRC reconfiguration message including SCG configuration information for MR-DC may be delivered by being included in an RRC reconfiguration message delivered via a master cell group. In another embodiment, in a method for configuring at least one of EN-DC, NE-DC, or NR-NR DC, as in a method indicated by Case B, in operation 1f-85, an RRC reconfiguration message including SCG configuration information may be delivered to the terminal via SRB3. The terminal may deliver, to the base station, an RRC reconfiguration complete message via an SRB received after the terminal receives an RRC reconfiguration message including an SCG configuration.

An ASN.1 code below corresponds to an example of an RRCReconfiguration message which may be used for SCG configuration of DC in an NR system. As can be noted from the following description, SCG configuration information for MR-DC may be included as mrdc-SecondaryCellGroup IE. In an embodiment, in order to configure NR-NR DC, SCG configuration information for NR-NR DC may be included as nr-SCG, and in order to configure NE-DC, SCG configuration information for NE-DC may be included as eutra-SCG.

```
RRCReconfiguration ::=                SEQUENCE {
    rrc-TransactionIdentifier             RRC-TransactionIdentifier,
    criticalExtensions                    CHOICE {
        rrcReconfiguration                    RRCReconfiguration-IEs,
        criticalExtensionsFuture              SEQUENCE { }
    }
}

RRCReconfiguration-IEs ::=            SEQUENCE {
    radioBearerConfig
OPTIONAL, -- Need M
        secondaryCellGroup                                    OCTET STRING (CONTAINING
CellGroupConfig)                          OPTIONAL, -- Need M
        measConfig                                                            MeasConfig
OPTIONAL, -- Need M
        lateNonCriticalExtension                                      OCTET   STRING
OPTIONAL,
        nonCriticalExtension                                  RRCReconfiguration-v1530-IEs
OPTIONAL
}
        RRCReconfiguration-v1530-IEs ::=      SEQUENCE {
        masterCellGroup                           OCTET STRING (CONTAINING
CellGroupConfig)         OPTIONAL, -- Need M
        fullConfig                                ENUMERATED {true}
OPTIONAL, -- Cond FullConfig
        dedicatedNAS-MessageList              SEQUENCE (SIZE(1..maxDRB)) OF
DedicatedNAS-Message OPTIONAL, -- Cond nonHO
        masterKeyUpdate                                       OPTIONAL,
-- Cond MasterKeyChange
        dedicatedSIB1-Delivery            OCTET STRING (CONTAINING SIB1)
                                         OPTIONAL,  -- Need N
        dedicatedSystemInformationDelivery    OCTET STRING (CONTAINING
SystemInformation) OPTIONAL, -- Need N
        otherConfig
OPTIONAL,           -- Need N
        nonCriticalExtension                                  RRCReconfiguration-v1540-IEs
OPTIONAL
}
        RRCReconfiguration-v1540-IEs ::=   SEQUENCE {
        mrdc-SecondaryCellGroup              CHOICE {
        nr-SCG              OCTET STRING,
        eutra-SCG           OCTET STRING
        }
OPTIONAL,          -- Need M
        radioBearerConfig2                        OCTET STRING (CONTAINING
RadioBearerConfig) OPTIONAL,    -- Need M
        sk-Counter                                INTEGER (0..65535)
```

```
            OPTIONAL,   -- Cond S-KeyChange
    nonCriticalExtension                    SEQUENCE { }
OPTIONAL
    }
```

FIG. 1G illustrates a flowchart for explaining an operation of a terminal having received RRC reconfiguration information including cell group configuration information for MR-DC, as Embodiment 1 proposed in the disclosure.

In operation 1g-05, the terminal in an RRC-connected state may receive an RRC reconfiguration (RRCReconfiguration) message from a base station, and the message may be received via SRB1 or SRB3. In this example, reception via SRB1 refers to reception via a signaling radio bearer of a master cell group, and reception via SRB3 refers to reception via a signaling radio bearer of a secondary cell group in the state in which DC is applied.

In operation 1g-10, the terminal may determine via which SRB an RRC reconfiguration message has been received. When an RRC reconfiguration message has been received via SRB1, in operation 1g-20, the terminal may identify how RRC reconfiguration information, such as CellGroupConfig, is included in the RRC reconfiguration message received via SRB1, and thus may operate differently. That is, as described below, the terminal may operate differently according to three conditions.

1. Case 1: RRC reconfiguration information, such as CellGroupConfig, is included as sub-information of nr-SCG (is included as indirect sub-information of an RRCReconfiguration message);
2. Case 2: RRC reconfiguration information, such as CellGroupConfig, is included as sub-information of eutra-SCG (is included as indirect sub-information of an RRCReconfiguration message); and
3. Case 3: RRC reconfiguration information, such as CellGroupConfig, is included as direct sub-information of an RRCReconfiguration message.

In the above description, direct sub-information refers to pieces of sub-information explicitly included in an RRC reconfiguration message received via SRB1, and indirect sub-information refers to sub-information included in direct sub-information of an RRC reconfiguration message received via SRB1. For example, an MCG configuration may be delivered by being included as direct sub-information of SRB1, but SCG configuration information for configuration of MR-DC may be delivered in the form of indirect sub-information by being included in a part of an RRC reconfiguration message.

In Case 1 described above, the terminal may determine that the received RRC reconfiguration includes SCG configuration information, in particular, CellGroupConfig and the like, for NR-NR DC, and in operation 1g-25, applies RRC reconfiguration of an nr-SCG. In operation 1g-30, the terminal does not generate an RRC reconfiguration complete (RRCReconfigurationComplete) message; and if spCellConfig of the received nr-SCG configuration includes reconfigurationWithSync (this may correspond to a case in which DC is configured through a handover process), in operation 1g-35, the terminal may indicate random access to an SCG NR MAC entity, that is, may trigger random access.

In Case 2 described above, the terminal may determine that the received RRC reconfiguration includes SCG configuration information, in particular, CellGroupConfig and the like, for NE-DC, and in operation 1g-40, applies RRC reconfiguration of an eutra-SCG. In operation 1g-45, the terminal does not generate an RRC reconfiguration complete (e.g., RRCReconfigurationComplete) message; and if spCellConfig of the received eutra-SCG configuration includes reconfigurationWithSync (this may correspond to a case in which DC is configured through a handover), in operation 1g-50, the terminal may indicate random access to an SCG LTE MAC entity, that is, may trigger random access.

In Case 3 described above, the terminal may determine that the received RRC reconfiguration includes MCG configuration information, in particular, CellGroupConfig and the like, and in operation 1g-55, may apply RRC reconfiguration of an MCG. In operation 1g-60, the terminal may generate an RRC reconfiguration complete (RRCReconfigurationComplete) message, and in operation 1g-65, may deliver an RRC reconfiguration complete (RRCReconfigurationComplete) message to an MCG MAC entity. The above-described Cases differ from each other with respect to whether to generate an RRC reconfiguration complete message, and the reason is as follows. When an RRC reconfiguration complete message is generated in an operation of configuring an SCG in Case 1 and Case 2, an RRC reconfiguration complete message is also generated in an operation of configuring an SCG in an MCG which is subsequently performed, and thus an RRC reconfiguration

```
    Refer to an ASN.1 code below
    RRCReconfiguration-v1540-IEs ::= SEQUENCE {
    mrdc-SecondaryCellGroup           CHOICE {
    nr-SCG             OCTET STRING,
    eutra-SCG          OCTET STRING
    }
OPTIONAL,         -- Need M
      radioBearerConfig2                     OCTET STRING (CONTAINING
RadioBearerConfig) OPTIONAL,  -- Need M
      sk-Counter                       INTEGER (0..65535)
                  OPTIONAL,   -- Cond S-KeyChange
    nonCriticalExtension                    SEQUENCE { }
OPTIONAL
    }
``` complete message is repeatedly generated, which results in an unnecessary operation of the terminal.

In operation 1g-10, the terminal may determine via which SRB an RRC reconfiguration message has been received, and if an RRC reconfiguration message has been received via SRB3, may determine this as a case in which the received RRC reconfiguration message includes SCG configuration information, in particular, CellGroupConfig for an SCG and the like; and in operation 1g-70, the terminal may apply RRC reconfiguration of an SCG. In operation 1g-75, the terminal may generate an RRC reconfiguration complete (RRCReconfigurationComplete) message, and in operation 1g-80, may deliver the RRC reconfiguration complete (RRCReconfigurationComplete) message to an SCG MAC entity.

This embodiment includes, in particular, a series of operations in which: the terminal receives an RRC reconfiguration message; in relation to an operation of the terminal after reception of the RRC reconfiguration message, the terminal determines via which SRB the terminal receives an RRC reconfiguration message, how SCG configuration information is included, and whether the corresponding configuration information includes reconfigurationWithSync; and thus the terminal determines whether to trigger random access. In the case of, in particular, MR-DC, cell group configuration information for an SCG is included as indirect sub-information of an RRCReconfiguration message, and thus an RRC layer having received the corresponding message may determine that the corresponding SCG configuration is received via a handover. That is, an RRC layer of an MCG having received an RRC reconfiguration may deliver, to an SCG MAC layer, an indicator for triggering random access.

FIG. 1H illustrates a flowchart for explaining an overall operation of a terminal when cell group configuration information for MR-DC includes encryption-related key information, as Embodiment 1 proposed in the disclosure.

The terminal in an RRC-connected state receives an RRC reconfiguration (RRCReconfiguration) message from a base station; the corresponding message includes secondary cell group configuration (mrdc-SecondaryCellGroup) information for MR-DC; and when sk-counter information used at one time for an encryption key of a corresponding secondary cell group is delivered, in operation 1h-05, to the terminal by being included in the corresponding message, in operation 1h-10, the terminal determines which DC configuration is included in the RRCReconfiguration message, and thus may operate differently. If the RRCReconfiguration message includes configuration information for EN-DC or NG-RAN E-UTRA NR dual connectivity (NGEN-DC) and the sk-counter information is delivered by being included in the corresponding message, in operation 1h-15, the terminal may apply the received sk-counter value to KeNB, which is an encryption key currently being used by a master cell group, so as to update the KeNB, may configure the value of the updated KeNB as S-KgNB, and may use the S-KgNB.

If the RRCReconfiguration message includes configuration information for NR-NR-DC or NE-DC and the sk-counter information is delivered by being included in the corresponding message, in operation 1h-20, the terminal may apply nextHopChainingCount to KgNB, which is encryption key information currently being used by a master cell group, so as to update the KgNB. In operation 1h-25, the terminal may apply the received sk-counter value to the encryption key (KgNB), and thus may update the KgNB. Further, in operation 1h-30, as an embodiment, the terminal, for which NR-NR DC is configured, configures a corresponding value as S-KgNB, and uses the S-KgNB. As an embodiment, the terminal, for which NE DC is configured, configures a corresponding value as S-KeNB, and uses the S-KeNB.

FIG. 1IA illustrates a block diagram of an internal configuration of a terminal to which the disclosure is applied.

Referring to FIG. 1IA, the terminal includes an RF processor 1ia-10, a baseband processor 1ia-20, a storage unit 1ia-30, and a controller 1ia-40.

The RF processor 1ia-10 may perform a function of transmitting or receiving a signal via a wireless channel, such as band conversion and amplification of a signal. That is, the RF processor 1ia-10 may up-convert a baseband signal, provided by the baseband processor 1ia-20, into an RF band signal and may then transmit the RF band signal via an antenna, and may down-convert an RF band signal, received via the antenna, into a baseband signal. For example, the RF processor 1ia-10 may include a transmission filter, a reception filter, an amplifier, a mixer, an oscillator, a digital-to-analog converter (DAC), an analog-to-digital converter (ADC), or the like. FIG. 1I illustrates only one antenna, but the terminal may be provided with multiple antennas. Also, the RF processor 1ia-10 may include multiple RF chains. Further, the RF processor 1ia-10 may perform beamforming. For the beamforming, the RF processor 1ia-10 may adjust the phase and magnitude of each of the signals transmitted or received via multiple antennas or antenna elements. Further, the RF processor 1ia-10 may perform MIMO and may receive multiple layers during execution of a MIMO operation.

The baseband processor 1ia-20 may perform a conversion function between a baseband signal and a bit stream according to a physical layer standard of a system. For example, when data is transmitted, the baseband processor 1ia-20 may generate complex symbols by encoding and modulating a transmission bit stream. Further, when data is received, the baseband processor 1ia-20 may reconstruct a received bit stream by demodulating and decoding the baseband signal provided by the RF processor 1ia-10. For example, according to an OFDM scheme, when data is transmitted, the baseband processor 1ia-20 may generate complex symbols by encoding and modulating a transmission bit stream, may map the complex symbols to subcarriers, and may then perform an inverse fast Fourier transform (IFFT) operation and a cyclic prefix (CP) insertion to configure OFDM symbols. Further, when data is received, the baseband processor 1ia-20 divides the baseband signal provided by the RF processor 1ia-10 in an OFDM symbol unit, reconstructs the signals mapped to the subcarriers by a fast Fourier transform (FFT), and then reconstructs a received bit stream by the demodulation and decoding.

The baseband processor 1ia-20 and the RF processor 1ia-10 may transmit and receive a signal as described above. Therefore, the baseband processor 1ia-20 and the RF processor 1ia-10 may be referred to as a "transmitter", a "receiver", a "transceiver", or a "communication unit". Also, at least one of the baseband processor 1ia-20 and the RF processor 1ia-10 may include multiple communication modules in order to support multiple different radio access technologies. Further, at least one of the baseband processor 1ia-20 and the RF processor 1ia-10 may include different communication modules in order to process signals in different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.5 GHz and 5 GHz) band and a millimeter wave (e.g., 60 GHz) band.

The storage unit 1*ia*-30 may store data such as basic programs, application programs, and configuration information for an operation of the terminal. In particular, the storage unit 1*ia*-30 may store information related to a second access node configured to perform wireless communication by using the second radio access technology. Further, the storage unit 1*ia*-30 may provide the stored data according to a request of the controller 1*ia*-40.

The controller 1*ia*-40 may control overall operations of the terminal. For example, the controller 1*ia*-40 transmits or receives a signal via the baseband processor 1*ia*-20 and the RF processor 1*ia*-10. Further, the controller 1*ia*-40 records and reads data in and from the storage unit 1*ia*-40. To this end, the controller 1*ia*-40 may include at least one processor. For example, the controller 1*ia*-40 may include a communication processor (CP) configured to perform a control for communication and an application processor (AP) configured to control a higher layer such as an application program.

FIG. 1IB illustrates a block diagram 1*ib*-00 of a configuration of an electronic device 1*ib*-01 for supporting legacy network communication and 5G network communication according to various embodiments. Referring to FIG. 1IB, the electronic device 1*ib*-01 may include a first communication processor 1*ib*-12, a second communication processor 1*ib*-14, a first radio frequency integrated circuit (RFIC) 1*ib*-22, a second RFIC 1*ib*-24, a third RFIC 1*ib*-26, a fourth RFIC 1*ib*-28, a first radio frequency front end (RFFE) 1*ib*-32, a second RFFE 1*ib*-34, a first antenna module 1*ib*-42, a second antenna module 1*ib*-44, and an antenna 1*ib*-48. The electronic device 1*ib*-01 may further include a processor 1*ib*-20 and a memory 1*ib*-30. A network 1*ib*-99 may include a first network 1*ib*-02 and a second network 1*ib*-94. According to another embodiment, the electronic device 1*ib*-01 may further include at least one component among the components illustrated in FIG. 1*ib*, and the network 1*ib*-99 may further include at least another network. According to an embodiment, the first communication processor 1*ib*-12, the second communication processor 1*ib*-14, the first RFIC 1*ib*-22, the second RFIC 1*ib*-24, the fourth RFIC 1*ib*-28, the first RFFE 1*ib*-32, and the second RFFE 1*ib*-34 may constitute at least a part of a wireless communication module 1*ib*-92. According to another embodiment, the fourth RFIC 1*ib*-28 may be omitted, or may be included as a part of the third RFIC 1*ib*-26.

The first communication processor 1*ib*-12 may support: establishment of a communication channel in a band to be used for wireless communication with the first network 1*ib*-92; and legacy network communication via the established communication channel. According to various embodiments, the first network may be a legacy network including a second-generation (2G) network, a 3G network, a 4G network, or an LTE network. The second communication processor 1*ib*-14 may support: establishment of a communication channel corresponding to a designated band (e.g., about 6 GHz to about 60 GHz) in a band to be used for wireless communication with the second network 1*ib*-94; and 5G network communication via the established communication channel. According to various embodiments, the second network 1*ib*-94 may be a 5G network defined in 3GPP. In addition, according to an embodiment, the first communication processor 1*ib*-12 or the second communication processor 1*ib*-14 may support: establishment of a communication channel corresponding to another designated band (e.g., about 6 GHz or lower) in a band to be used for wireless communication with the second network 1*ib*-94; and 5G network communication via the established communication channel. According to an embodiment, the first communication processor 1*ib*-12 and the second communication processor 1*ib*-14 may be implemented in a single chip or a single package. According to various embodiments, the first communication processor 1*ib*-12 or the second communication processor 1*ib*-14 may be implemented in a single chip or a single package together with the processor 1*ib*-20, an auxiliary processor 1*ib*-23, or a communication module 1*ib*-90.

During transmission, the first RFIC 1*ib*-22 may convert a baseband signal, generated by the first communication processor 1*ib*-12, into an RF signal having a frequency of about 700 MHz to about 3 GHz and used in the first network 1*ib*-92 (e.g., a legacy network). During reception, an RF signal may be acquired from the first network 1*ib*-92 (e.g., a legacy network) via an antenna (e.g., the first antenna module 1*ib*-42), and may be preprocessed by an RFFE (e.g., the first RFFE 1*ib*-32). The first RFIC 1*ib*-22 may convert the preprocessed RF signal into a baseband signal so that the preprocessed RF signal can be processed by the first communication processor 1*ib*-12.

During transmission, the second RFIC 1*ib*-24 may convert a baseband signal, generated by the first communication processor 1*ib*-12 or the second communication processor 1*ib*-14, into an RF signal (hereinafter, "5G Sub-6 RF signal") having a Sub-6 band (e.g., about 6 GHz or lower) and used in the second network 1*ib*-94 (e.g., a 5G network). During reception, a 5G Sub-6 RF signal may be acquired from the second network 1*ib*-94 (e.g., a 5G network) via an antenna (e.g., the second antenna module 1*ib*-44), and may be preprocessed by an RFFE (e.g., the second RFFE 1*ib*-34). The second RFIC 1*ib*-24 may convert the preprocessed 5G Sub-6 RF signal into a baseband signal so that the preprocessed 5G Sub-6 RF signal can be processed by a corresponding communication processor among the first communication processor 1*ib*-12 and the second communication processor 1*ib*-14.

During transmission, the third RFIC 1*ib*-26 may convert a baseband signal, generated by the second communication processor 1*ib*-14, into an RF signal (hereinafter, "5G above-6 RF signal") having a 5G above-6 band (e.g., about 6 GHz to about 60 GHz) and to be used in the second network 1*ib*-94 (e.g., a 5G network). During reception, a 5G above-6 RF signal may be acquired from the second network 1*ib*-94 (e.g., a 5G network) via an antenna (e.g., the antenna 1*ib*-48), and may be preprocessed by the third RFFE 1*ib*-36. The third RFIC 1*ib*-26 may convert the preprocessed 5G above-6 RF signal into a baseband signal so that the preprocessed 5G above-6 RF signal can be processed by the second communication processor 1*ib*-14. According to an embodiment, the third RFFE 1*ib*-36 may be implemented as a part of the third RFIC 1*ib*-26.

According to an embodiment, the electronic device 1*ib*-01 may include the fourth RFIC 1*ib*-28 separately from, or at least a part of, the third RFIC 1*ib*-26. In this configuration, the fourth RFIC 1*ib*-28 may convert a baseband signal, generated by the second communication processor 1*ib*-14, into an RF signal (hereinafter, "IF signal") in an intermediate frequency band (e.g., about 9 GHz to about 11 GHz), and then deliver the IF signal to the third RFIC 1*ib*-26. The third RFIC 1*ib*-26 may convert the IF signal into a 5G above-6 RF signal. During reception, a 5G above-6 RF signal may be received from the second network 1*ib*-94 (e.g., a 5G network) via an antenna (e.g., the antenna 1*ib*-48), and may be converted into an IF signal by the third RFIC 1*ib*-26. The fourth RFIC 1*ib*-28 may convert the IF signal into a baseband signal so that the IF signal can be processed by the second communication processor 1*ib*-14.

According to an embodiment, the first RFIC 1*ib*-22 and the second RFIC 1*ib*-24 may be implemented as at least a part of a single chip or a single package. According to an embodiment, the first RFFE 1*ib*-32 and the second RFFE 1*ib*-34 may be implemented as at least a part of a single chip or a single package. According to an embodiment, at least one antenna module among the first antenna module 1*ib*-42 and the second antenna module 1*ib*-44 may be omitted, or may be combined with another antenna module, and thus may process RF signals in corresponding multiple bands.

According to an embodiment, the third RFIC 1*ib*-26 and the antenna 1*ib*-48 are arranged on the same substrate so as to constitute the third antenna module 1*ib*-46. For example, the wireless communication module 1*ib*-02 or the processor 1*ib*-20 may be disposed on a first substrate (e.g., a main PCB). In this configuration, the third RFIC 1*ib*-26 may be disposed in a partial area (e.g., a lower surface) of a second substrate (e.g., a sub-PCB) separate from the first substrate, and the antenna 1*ib*-48 may be disposed in another partial area (e.g., an upper surface) of the second substrate, so as to constitute the third antenna module 1*ib*-46. According to an embodiment, the antenna 1*ib*-48 may include, for example, an antenna array which can be used for beamforming. The third RFIC 1*ib*-26 and the antenna 1*ib*-48 may be arranged on the same substrate, and thus the length of a transmission line therebetween can be reduced. This configuration enables a reduction in, for example, loss (e.g., attenuation) in a case where a signal in a high-frequency band (e.g., about 6 GHz to about 60 GHz) used for a 5G network communication passes through a transmission line. Therefore, the electronic device 1*ib*-01 can improve the quality or speed at the time of communication with the second network 1*ib*-94 (e.g., a 5G network).

The second network 1*ib*-94 (e.g., a 5G network) may be operated independently of the first network 1*ib*-92 (e.g., a legacy network) (e.g., stand-alone (SA)), or may be operated in connection with the first network 1*ib*-92 (e.g., non-stand-alone (NSA)). For example, a 5G network may include only an access network (e.g., a 5G radio access network (RAN) or a next-generation RAN (NG RAN)), but may not include a core network (e.g., a next-generation core (NGC)). In this example, the electronic device 1*ib*-01 may access the access network of the 5G network, and may then access an external network (e.g., the Internet) under the control of a core network (e.g., an evolved packet core (EPC) network) of a legacy network. Protocol information (e.g., LTE protocol information) for communication with the legacy network or protocol information (e.g., NR protocol information) for communication with the 5G network may be stored in the memory 1*ib*-30, and may be accessed by another component (e.g., the processor 1*ib*-20, the first communication processor 1*ib*-12, or the second communication processor 1*ib*-14).

FIG. 1J illustrates a block diagram of a configuration of a base station according to the disclosure.

As illustrated in FIG. 1J, the base station includes an RF processor 1*j*-10, a baseband processor 1*j*-20, a backhaul communication unit 1*j*-30, a storage unit 1*j*-40, and a controller 1*j*-50.

The RF processor 1*j*-10 may perform a function of transmitting or receiving a signal via a wireless channel, such as band conversion and amplification of a signal. That is, the RF processor 1*j*-10 may up-convert a baseband signal, provided by the baseband processor 1*j*-20, into an RF band signal and may then transmit the RF band signal via an antenna, and may down-convert an RF band signal, received via the antenna, into a baseband signal. For example, the RF processor 1*j*-10 may include a transmission filter, a reception filter, an amplifier, a mixer, an oscillator, a DAC, an ADC, or the like. FIG. 1J illustrates only one antenna, but a first access node may be provided with multiple antennas. Also, the RF processor 1*j*-10 may include multiple RF chains. Further, the RF processor 1*j*-10 may perform beamforming. For the beamforming, the RF processor 1*j*-10 may adjust the phase and magnitude of each of the signals transmitted or received via multiple antennas or antenna elements. The RF processor 1*j*-10 may be configured to transmit one or more layers for a downlink MIMO operation.

The baseband processor 1*j*-20 may perform a conversion function between a baseband signal and a bit stream according to a physical layer standard of first radio access technology. For example, when data is transmitted, the baseband processor 1*j*-20 may generate complex symbols by encoding and modulating a transmission bit stream. Further, when data is received, the baseband processor 1*j*-20 may reconstruct a received bit stream by demodulating and decoding the baseband signal provided by the RF processor 1*j*-10. For example, according to an OFDM scheme, when data is transmitted, the baseband processor 1*j*-20 may generate complex symbols by encoding and modulating a transmission bit stream, may map the complex symbols to subcarriers, and may then perform an IFFT operation and a CP insertion to configure OFDM symbols. Further, when data is received, the baseband processor 1*j*-20 may divide the baseband signal provided by the RF processor 1*j*-10 in an OFDM symbol unit, may reconstruct the signals mapped to the subcarriers by a fast Fourier transform (FFT) operation, and may then reconstruct a received bit stream through demodulation and decoding. The baseband processor 1*j*-20 and the RF processor 1*j*-10 may transmit and receive signals as described above. Accordingly, the baseband processor 1*j*-20 and the RF processor 1*j*-10 may be referred to as a "transmitter", a "receiver", a "transceiver", a "communication unit", or a "wireless communication unit".

The backhaul communication unit 1*j*-30 may provide an interface for communication with other nodes in a network. That is, the backhaul communication unit 1*j*-30 may convert a bit stream, transmitted from the main base station to another node, for example, a secondary base station or a core network, into a physical signal, and may convert a physical signal, received from said another node, into a bit stream.

The storage unit 1*j*-40 may store data such as basic programs, application programs, and configuration information for an operation of the main base station. In particular, the storage unit 1*j*-40 may store information on the bearers allocated to accessed terminals, measurement results reported by the accessed terminals, and the like. Also, the storage unit 1*j*-40 may store the information which becomes a standard of determination of whether to provide or stop providing multi-connectivity to a terminal. Further, the storage unit 1*j*-40 may provide the stored data according to a request of the controller 1*j*-50.

The controller 1*j*-50 may control overall operations of the main base station. For example, the controller 1*j*-50 may transmit or receive a signal via the baseband processor 1*j*-20 and the RF processor 1*j*-10, or via the backhaul communication unit 1*j*-30. Further, the controller 1*j*-50 records and reads data in and from the storage unit 1*j*-40. To this end, the controller 1*j*-50 may include at least one processor.

FIG. 1K illustrates a flowchart for explaining an operation of a terminal having received RRC reconfiguration information in the embodiment described with reference to FIG. 1G, as Embodiment 2 proposed in the disclosure.

In operation 1k-10, the terminal may determine via which SRB an RRCReconfiguration message has been received. In an embodiment, reception via SRB1 may refer to reception via a signaling radio bearer of a master cell group, and reception via SRB3 may refer to reception via a signaling radio bearer of a secondary cell group in the state in which DC is applied.

In operation 1k-20, the terminal identifies the RRCReconfiguration message, and thus identifies a DC configuration. Identifying of the DC configuration may include a process of identifying whether RRC reconfiguration information, such as CellGroupConfig, is included as direct sub-information in RRCReconfiguration or is included as indirect sub-information in RRCReconfiguration. Further, the identifying of the DC configuration may include a process of identifying whether the RRC reconfiguration information, such as CellGroupConfig, includes reconfigurationWithSync.

In operation 1k-30, the terminal may perform a process of identifying whether RAT of an SCG included in the RRC reconfiguration information, such as CellGroupConfig, is LTE (eutra-SCG) or NR (nr-SCG).

In operation 1k-40, the terminal may perform a process of determining whether it is necessary to generate an RRCReconfigurationComplete message by using at least one piece of information among the pieces of information identified in operations 1k-10, 1k-20, and 1k-30. That is, during execution of an operation related to an RRCReconfigration message included in an mrdc-SecondaryCellGroup message, an RRCReconfigurationComplete message may not be generated. According to an embodiment, in the processes illustrated in FIG. 1G, when an RRC reconfiguration message is received via SRB1, if nr-SCG is included as indirect sub-information of the RRCReconfiguration message, an RRCReconfigurationComplete message may not be generated. According to another embodiment, in the processes illustrated in FIG. 1G, when an RRC reconfiguration message is received via SRB1, if eutra-SCG is included as indirect sub-information of the RRCReconfiguration message, an RRCReconfigurationComplete message may not be generated. According to still another embodiment, in the processes illustrated in FIG. 1G, when an RRC reconfiguration message is received via SRB1, if information on a DC configuration is included as direct sub-information of the RRCReconfiguration message, an RRCReconfigurationComplete message may be generated. According to yet another embodiment, in the processes illustrated in FIG. 1G, when an RRC reconfiguration message is received via SRB3, an RRCReconfigurationComplete message may be generated.

In operation 1k-50, the terminal may perform a process in which an RRC layer instructs a MAC layer to perform a RACH process by using at least one piece of information among the pieces of information identified in operations 1k-10, 1k-20, and 1k-30. That is, when an MCG is configured as NR and RRCReconfiguration is received via SRB1, if spCellConfig 1E of nr-SCG includes reconfigurationWithSync, an RRC layer of the terminal may instruct a MAC related to a PSCell to perform a RACH process. Further, when an MCG is configured as NR and RRCReconfiguration is received via SRB1, if eutra-SCG includes mobilityControlInfoSCG, the RRC layer of the terminal may instruct the MAC related to a PSCell to perform a RACH process. According to an embodiment, in the processes illustrated in FIG. 1G, when an RRC reconfiguration message is received via SRB1, if nr-SCG is included as indirect sub-information of the RRCReconfiguration message, the RRC layer of the terminal may instruct an SCG NR MAC to perform a RACH process. According to another embodiment, in the processes illustrated in FIG. 1G, when an RRC reconfiguration message is received via SRB1, if eutra-SCG is included as indirect sub-information of the RRCReconfiguration message, the RRC layer of the terminal may instruct an SCG LTE MAC to perform a RACH process. According to still another embodiment, in the processes illustrated in FIG. 1G, when an RRC reconfiguration message is received via SRB1, if information on a DC configuration is included as direct sub-information of the RRCReconfiguration message, the RRC layer of the terminal does not issue an instruction to perform a RACH process, but may deliver the generated RRCReconfigurationComplete message to an MCG MAC. According to yet another embodiment, in the processes illustrated in FIG. 1G, when an RRC reconfiguration message is received via SRB3, the RRC layer of the terminal does not issue an instruction to perform a RACH process, but may deliver the generated RRCReconfigurationComplete message to an MCG MAC.

Embodiment 2 can be summarized as follows:
Reception of RRCReconfiguration information via SRB1;
RRC reconfiguration information, such as CellGroupConfig, is included as direct sub-information of nr-SCG, or RRCReconfiguration message is included as direct sub-information of nr-SCG of another RRCReconfiguration message (or the RRC reconfiguration information or RRCReconfiguration message is included as indirect sub-information of an RRCReconfiguration message),
Do not generate a complete message, and
Indicate random access to an SCG NR MAC;
RRC reconfiguration information is included as sub-information of eutra-SCG, or RRCReconfiguration message is included as sub-information of eutra-SCG of another RRCReconfiguration message (or the RRC reconfiguration information or RRCReconfiguration message is included as indirect sub-information of an RRCReconfiguration message),
Do not generate a complete message, and
Indicate random access to an SCG LTE MAC;
RRC reconfiguration information, such as CellGroupConfig, is included as direct sub-information of an RRCReconfiguration message,
Generate a complete message, and
Deliver the complete message to an MCG MAC;
Reception of RRCReconfiguration information via SRB3;
Generate a complete message; and
Deliver the complete message to an SCG MAC.

Direct sub-information may refer to sub-information explicitly included in an RRC reconfiguration message. Indirect sub-information may refer to sub-information included in direct sub-information of an RRC reconfiguration message.

FIG. 1L illustrates a view of an example of an architecture of a next-generation mobile communication system to which the disclosure is applied.

Further, FIG. 1M illustrates a view of another example of an architecture of a next-generation mobile communication system to which the disclosure is applied.

FIG. 1L illustrates an example of configuring NR-DC, and FIG. 1M illustrates an example of configuring NR-DC. As illustrated in FIG. 1L and FIG. 1M, a radio access network of a next-generation mobile communication system (NR) may include a next-generation base station (a new radio Node B, hereinafter "gNB") 1l-10, 1l-30, or 1m-10 and an access & mobility management function (AMF) (or a new radio core network) 1*l*-05, 1*l*-25, or 1*m*-05. A user equipment (a new radio user equipment, hereinafter "NR UE" or "terminal") 1*l*-15 or 1*m*-15 accesses an external network via the gNB 1*l*-10 or 1*m*-10 and the AMF 1*l*-05 or 1*m*-05.

Referring to FIG. 1L and FIG. 1M, consideration may be given to a situation in which a macro-cell and a pico-cell coexist. The macro-cell is controlled by a macro base station, and provides a service in a relatively large area. In contrast, the pico-cell is controlled by an SeNB, and in general, provides a service in a remarkably small area compared to the macro-cell. Although there is no strict criterion for distinguishing between the macro-cell and the pico-cell, it may be assumed that, for example, an area of the macro-cell has a radius of about 500 meters and an area of the pico-cell has a radius of about tens of meters. In embodiments, the terms "pico-cell" and "small cell" are used interchangeably. In this example, a macro-cell may be an LTE base station or an NR base station (MeNB or MgNB), and a pico-cell may be an NR base station or an LTE base station (SeNB or SgNB). In particular, a 5G base station supporting a pico-cell may use a frequency band of 6 GHz or higher.

In embodiments, consideration may be given to a situation in which a macro-cell and a macro-cell coexist. The macro-cell is controlled by a macro base station, and provides a service in a relatively large area. In this example, the macro-cell may include an LTE base station (MeNB) and an LTE base station (SeNB). According to another embodiment, the macro-cell may include an LTE base station (MeNB) and an NR base station (SgNB). According to still another embodiment, the macro-cell may include an NR base station (MgNB) and an LTE base station (SeNB). According to yet another embodiment, the macro-cell may include an NR base station (MgNB) and an NR base station (SgNB).

Both a 4G system (LTE) and a 5G system are based on OFDM. LTE has a subcarrier spacing (SCS) fixed to 15 kHz, whereas the 5G system may support multiple SCSs (e.g., 7.5 kHz, 15 kHz, 30 kHz, 60 kHz, and 120 kHz) in order to provide various services (e.g., eMBB, URLLC, and mMTC) and provide wireless communication in various frequency ranges (e.g., sub-6 GHz and above-6 GHz). Further, the 5G system may allow multiple SCSs to be time-division-multiplexed (TDMed) or frequency-division-multiplexed (FDMed) even in one carrier. In addition, a maximum bandwidth of one component carrier (CC) is assumed to be 20 MHz in LTE, but a maximum of up to 1 GHz may be considered as a bandwidth of one CC in the 5G system.

Therefore, in the 5G system, radio resources having different SCSs may be FDMed or TDMed. A subframe is assumed to be a basic unit of scheduling in LTE, but a slot having 14 symbols may be assumed to be a basic unit of scheduling in the 5G system. That is, an absolute time of a subframe is always fixed to 1 ms in LTE, but the length of a slot may vary according to SCSs in the 5G system.

In particular, in 3GPP, an SS/physical broadcast channel (PBCH) block is defined for a synchronization signal (SS) used in an initial access procedure. An SS/PBCH block may at least include a primary synchronization signal (PSS), a secondary synchronization signal (SSS), and a PBCH. Also, when an SS/PBCH block is transmitted, a PSS, an SSS, and a PBCH may always be transmitted in the sequential order thereof. Further, an SCS of an SS/PBCH block may be transmitted at one of 15 kHz, 30 kHz, 120 kHz, and 240 kHz according to frequency bands. More specifically, an SCS having 15 kHz or 30 kHz may be transmitted in a frequency band of 6 GHz or lower, and an SCS may be transmitted at either 120 kHz or 240 kHz in a frequency band of 6 GHz or higher. In addition, the above-described frequency bands may be classified in more detail, and thus an SS/PBCH block generated to have one SCS may be transmitted in each frequency band.

Further, multiple SS/PBCH blocks may be transmitted in one operating band. The purpose of this configuration is to allow terminals having various capabilities to coexist and operate in a system bandwidth. In this example, the system bandwidth is increased, but a position of an SS/PBCH block received by a terminal may vary according to network configurations. Also, a time point of transmission of an SS/PBCH block may vary according to network configurations. Further, an interval of transmission of an SS/PBCH block may vary. More specifically, as in the case of the following message, information notifying of a channel bandwidth of a system serves to notify of an SCS value used in the corresponding channel bandwidth.

FIG. 1N(A) illustrates a view for explaining bandwidth adaptation technology according to various embodiments, FIG. 1N(B) illustrates a view for explaining bandwidth adaptation technology according to various embodiments, and FIG. 1N(C) illustrates a view for explaining bandwidth adaptation technology according to various embodiments.

Referring to FIG. 1N(A), FIG. 1N(B), and FIG. 1N(C), a base station may provide information on a bandwidth part (hereinafter, "BWP") related to a carrier bandwidth. A terminal may receive information on a BWP from the base station. According to various embodiments, information on a BWP may include bandwidth part configuration information. According to an embodiment, bandwidth part configuration information may include configuration values necessary for the terminal to use a bandwidth of a transmission signal as a BWP. For example, the bandwidth part configuration information may include the position of a frequency resource of a BWP, a bandwidth of a frequency resource of a BWP, and numerology information related to an operation of a BWP. According to an embodiment, numerology information of a BWP may include at least one piece of information among: SCS information; information on a type of a cyclic prefix (e.g., a type indicating whether a cyclic prefix is a normal cyclic prefix or an extended cyclic prefix) of OFDM; and information on the number of symbols (e.g., seven symbols or 14 symbols) included in one slot. According to various embodiments, the terminal may activate at least one BWP based on the bandwidth part configuration information received from the base station, and may transmit or receive a control signal or data based on the activated BWP.

Referring to FIG. 1N(A), the terminal may receive, from the base station, bandwidth part configuration information on one BWP 1*n*-01, and may activate the BWP 1*n*-01 based on the bandwidth part configuration information on the one BWP 1*n*-01. According to an embodiment, the BWP 1*n*-01 may be an operating band configured based on the radio frequency (RF) capability of the terminal.

Referring to FIG. 1N(B), the terminal may receive, from the base station, bandwidth part configuration information on multiple BWPs (e.g., a BWP 1 1*n*-1l and a BWP 2 1*n*-21). According to an embodiment, the multiple BWPs may include a BWP (e.g., the BWP 1 1*n*-11) related to a basic operating band configured based on the RF capability of the terminal, and in addition to the BWP, may include a BWP (e.g., the BWP 2 1*n*-21) related to an additional operating band. According to various embodiments, a BWP related to an additional operating band may be at least one BWP.

According to various embodiments, a BWP related to an additional operating band may be a BWP having a numerology characteristic different from that of a basic operating band. According to various embodiments, BWPs related to at least two additional operating bands may have different numerology characteristics. The terminal may select and activate one of the BWP 1 1*n*-11 and the BWP 2 1*n*-21 based on bandwidth part configuration information on the BWP 1 1*n*-11 and bandwidth part configuration information on the BWP 2 1*n*-21. According to an embodiment, the base station may instruct the terminal to select and activate one of the BWP 1 1*n*-11 and the BWP 2 1*n*-21.

Referring to FIG. 1N(C), the terminal may receive, from the base station, bandwidth part configuration information on multiple BWPs (e.g., a BWP 3 (numerology 1) 1*n*-31 and a BWP 4 (numerology 2) 1*n*-41) having different numerology characteristics. According to an embodiment, the multiple BWPs may include the BWP 3 (numerology 1) 1*n*-31 having a first numerology characteristic or the BWP 4 (numerology 2) 1*n*-41 having a second numerology characteristic. The terminal may select and activate one of the BWP 3 (numerology 1) 1*n*-31 and the BWP 4 (numerology 2) 1*n*-41 based on numerology information included in each piece of information among bandwidth part configuration information on the BWP 3 (numerology 1) 1*n*-31 and bandwidth part configuration information on the BWP 4 (numerology 2) 1*n*-41. For example, the terminal may select and activate one of the BWP 3 (numerology 1) 1*n*-31 and the BWP 4 (numerology 2) 1*n*-41 based on at least one piece of information among: SCS information; information on a type of a cyclic prefix (e.g., a type indicating whether a cyclic prefix is a normal cyclic prefix or an extended cyclic prefix) of OFDM; or information on the number of symbols (e.g., seven symbols or 14 symbols) included in one slot, which are included in the numerology information included in each piece of information among the bandwidth part configuration information on the BWP 3 (numerology 1) 1*n*-31 and the bandwidth part configuration information on the BWP 4 (numerology 2) 1*n*-41.

According to various embodiments, the terminal may select a BWP to be activated, from multiple BWPs based on reception of a radio resource control (RRC) signal from the base station, or may select a BWP to be activated, based on information on whether to activate a BWP, which is included in at least one piece of bandwidth part configuration information among pieces of bandwidth part configuration information of the multiple BWPs. As another example, the terminal may select a BWP to be activated, based on reception of downlink control information (DCI) from the base station. As still another example, the terminal may select a BWP to be activated, based on reception of a medium access control (MAC) control element (CE) from the base station.

According to an embodiment, when an RRC signal is used, the base station may transmit an RRC signal by including, in the RRC signal, information on a frequency resource allocated by a network, or time information related to at least one BWP. For example, the terminal may select and activate one of BWPs based on information on a frequency resource allocated by a network, or time information related to at least one BWP, which is included in an RRC signal. For example, the time information related to at least one BWP may include a time pattern for changing the BWP. The time pattern may include operating slot information or operating subframe information of BWPs, or a designated operating time thereof.

According to an embodiment, when bandwidth part configuration information is used, the bandwidth part configuration information may include a bitmap indicating whether to activate bandwidth part configuration information of BWPs. The terminal may select a BWP to be activated, based on the bitmap. For example, the bitmap may have a value of 0 or 1. If the bitmap has a value of 0 (or 1 or another designated value), this may represent activation, and if the bitmap has a value of 1 (or 0 or another designated value), this may represent deactivation. The terminal may select a BWP to be activated, according to the value of a bitmap included in the bandwidth part configuration information of the BWPs.

According to an embodiment, when DCI is used, the base station may include, in DCI, information for activation of at least one BWP. The terminal may select a BWP to be activated, from multiple BWPs based on information included in the DCI. If a BWP to be activated based on information included in the DCI is identical to a BWP (e.g., the BWP 1 1*n*-11) already being activated, the terminal may ignore the value of the DCI. If a BWP to be activated based on information included in the DCI is different from the BWP 1 1*n*-11 already being activated, the terminal may change the BWP 1 1*n*-11, which is already being activated, to a BWP (e.g., the BWP 2 1*n*-21) corresponding to the information included in the DCI, and thus may activate the corresponding BWP. For example, when a predetermined time elapses from a time point of reception of the DCI (e.g., a time in a slot unit or a time in a subframe unit), the terminal may activate the BWP 2 1*n*-21.

According to an embodiment, when DCI is used, bandwidth part configuration information of BWPs may include an index indicating whether to activate a BWP. The terminal may select a BWP to be activated, based on the index. As one embodiment, bandwidth part configuration information may include an index of each BWP. For example, when DCI including an index of a BWP to be activated is received, the terminal may activate the corresponding BWP, and may deactivate a BWP other than the corresponding BWP.

According to an embodiment, when a MAC CE is used, the base station may include, in a MAC CE, information for activation of at least one BWP. The terminal may select a BWP to be activated, from multiple BWPs based on information included in a MAC CE. If a BWP to be activated based on information included in the MAC CE is identical to a BWP (e.g., the BWP 1 1*n*-11) already being activated, the terminal may ignore the value of the MAC CE. If a BWP to be activated based on information included in the MAC CE is different from the BWP 1 1*n*-11 already being activated, the terminal may change the BWP 1 1*n*-11, which is already being activated, to a BWP (e.g., the BWP 2 1*n*-21) corresponding to the information included in the MAC CE, and thus may activate the corresponding BWP. When a predetermined time elapses from a time point of reception of the MAC CE (e.g., a time in a slot unit or a time in a subframe unit), the terminal may activate the BWP 2 1*n*-21.

FIG. 1O illustrates a view for explaining bandwidth adaptation technology according to various embodiments.

Referring to FIG. 1O, according to various embodiments, BWPs (e.g., carrier bandwidth part 0, carrier bandwidth part 1, or carrier bandwidth part 2) may be allocated in a carrier bandwidth. According to an embodiment, BWPs may be allocated based on a designated physical resource block (hereinafter, "PRB"), for example, a PRB 0 1*o*-01, in a carrier bandwidth. A PRB may correspond to, for example, a designated bandwidth unit which can be used by a terminal. According to an embodiment, multiple PRBs may be allocated to multiple BWPs. For example, multiple PRBs, for example, N1 to N1+a (as indicated by reference numeral 1o-11), may be allocated to carrier bandwidth part 0; multiple PRBs, for example, N2 to N2+b (as indicated by reference numeral 1o-21), may be allocated to carrier bandwidth part 1; and multiple PRBs, for example, N3 to N3+c (as indicated by reference numeral 1o-31), to carrier bandwidth part 2. For example, N1, N2, or N3 may be a start PRB, and a, b, or c, which represents the number of bandwidths of a BWP, may represent the number of PRBs.

According to various embodiments, the terminal may use a bandwidth corresponding to an entire BWP, or may use a bandwidth corresponding to at least one PRB included in a BWP.

FIG. 1P illustrates a diagram of an example of an SS/PBCH block according to an embodiment. FIG. 1Q illustrates a diagram illustrating another example of an SS/PBCH block according to an embodiment. Further, FIG. 1R illustrates a diagram illustrating an example of a method for transmitting an SS/PBCH block.

Referring to FIG. 1P, in a 5G system defined in 3GPP, any frequency bandwidth (a wide bandwidth CC) may include at least one SS/PBCH block 1p-100. Further, the SS/PBCH block may be transmitted by including not only a PSS 1p-10/an SSS 1p-30 but also PBCHs 1p-20, 1p-40, and 1p-50.

The SS/PBCH block may be transmitted in the structure illustrated in FIG. 1P. The PSS 1p-10, the first PBCH 1p-20, the SSS 1p-30, and the second PBCH 1p-40 may be transmitted on different symbols, and in relation to a frequency, 20 RBs may be used to transmit the SS/PBCH block 1p-100. Also, a part 1p-50 of a PBCH may be transmitted on a symbol for transmission of the SSS 1p-30. Further, the center of the PSS 1p-10, the SSS 1p-30, and the PBCHs 1p-20, 1p-40, and 1p-50 may be aligned.

In addition, referring to FIG. 1R, when an SS/PBCH block is transmitted in 3GPP, the SS/PBCH block is transmitted not in line with a resource block (RB) grid, but may be transmitted with an offset on an OFDM subcarrier grid. Notification of an offset value of a subcarrier grid applied to this configuration may be provided via a PBCH.

Referring again to FIG. 1P, as exemplified by reference numeral 1p-70, a candidate position, at which the SS/PBCH block 1p-100 including four symbols can be transmitted in two consecutive slots (14 symbols) of 120 kHz, may be determined. For reference, in 3GPP, one slot may include 14 symbols. Alternatively, one slot may include seven symbols. Further, as exemplified by reference numeral 1p-75 in FIG. 1P, a candidate position, at which the SS/PBCH block 1p-100 including four symbols can be transmitted in four consecutive slots (28 symbols) of 240 kHz, may be determined. As an embodiment, candidate positions for transmission of a total of 64 SS/PBCH blocks 1p-100's above 6 (240 kHz) may be determined based on an arrangement in a slot exemplified in FIG. 1P.

Further, a transmission pattern on a time axis of the SS/PBCH block 1p-100 may be repeated at every predetermined cycle. The transmission pattern on the time axis makes it possible to determine a candidate position, at which the SS/PBCH block 1p-100 can be transmitted in a slot, in 3GPP, and thus a maximum of 64 SS/PBCH blocks (above 6 GHz, eight SS/PBCH blocks for below 6 GHz and four SS/PBCH blocks for below 3 GHz) may be transmitted in the first 5 ms. In addition, a network may determine a pattern of actual transmission, from the candidate positions. The pattern may be repeated in a cycle, such as 5, 10, ..., 160 ms, and may be determined by a base station. In this regard, a terminal may basically regard that a repetition cycle of the pattern is 20 ms in an initial access procedure, and may perform the initial access procedure.

A candidate position, at which an SS/PBCH block 1q-100 can be transmitted for below 6 GHz, may be identical to that illustrated as an example in FIG. 1Q. As exemplified by reference numeral 1q-80, for 15 kHz, positions, at which two SS/PBCH blocks 1q-100's can be transmitted in one slot (14 symbols), may be determined. Further, as exemplified by reference numeral 1q-85, for 30 kHz, positions, at which four SS/PBCH blocks 1q-100's can be transmitted in two consecutive slots (14 symbols), may be determined.

In addition, a transmission pattern on a time axis of the SS/PBCH block 1p-100 or 1q-100 may be repeated at every predetermined cycle. The transmission pattern on the time axis makes it possible to a candidate position, at which the SS/PBCH block 1p-100 or 1q-100 can be transmitted in a slot, in 3GPP, and thus a maximum of eight SS/PBCH blocks (above 6 GHz, eight SS/PBCH blocks for below 6 GHz and four SS/PBCH blocks for below 3 GHz) may be transmitted in the first 5 ms. Further, a network may determine a pattern of actual transmission, from the candidate positions. The pattern may be repeated in a cycle, such as 5, 10, ..., 160 ms, and may be determined by the base station. In this regard, the terminal may basically regard that a repetition cycle of the pattern is 20 ms in an initial access procedure, and may perform the initial access procedure.

Multiple SS/PBCH blocks may be transmitted on a frequency axis in a frequency band operated by one base station. In this example, a frequency location for transmission of an SS/PBCH block may be determined by a network, and may be detected by the terminal by using an interval used to find an SS/PBCH block and defined in standards.

Further, in a 5G system, at least one cell may exist in a frequency band operated by one base station. From the aspect of the terminal, one cell may be associated with one SS/PBCH block. Such an SS/PBCH block may be referred to as "SS/PBCH block associated with a cell", "SS/PBCH block defining a cell", "cell-defining SS/PBCH block" and the like, and the disclosure is not limited to the terms. That is, when the terminal completes downlink (DL)/uplink (UL) sync and even an RRC connection/NAS connection based on an SS/PBCH block found in a frequency detection process, an SS/PBCH block associated with a corresponding cell may be referred to as a "cell-defining SS/PBCH block".

FIG. 1S illustrates a diagram of a frame structure according to an embodiment.

Referring to FIG. 1S, a system frequency band (a wideband CC) of a base station may include multiple sub operating frequency bands (which are described as sub-CCs in the disclosure). For example, four sub-CCs, that is, sub-CC 1, sub-CC 2, sub-CC 3, and sub-CC 4, are described by way of example as sub operating frequency bands but the disclosure is not limited thereto, and three or fewer sub operating frequency bands, or five or more sub operating frequency bands may be included in an operating frequency band of the base station. The sub operating frequency bands are set forth for convenience of description in the disclosure, and may not be logically or physically distinguished therebetween from the aspect of actual standards or implementation.

RF capability 1s-10, which is one of UE capabilities, refers to a bandwidth (BW) that can be supported by a terminal by using one RF. It is assumed in FIG. 1S that a terminal (a target UE) supports three consecutive CCs (sub-CC 1, sub-CC 2, and sub-CC 3) through one RF.

Accordingly, an operating frequency band of the terminal may be a frequency band including sub-CC 1, sub-CC 2, and sub-CC 3.

Further, in the example of FIG. 1S, it may be assumed that an SS/PBCH block exists in sub-CC 1, sub-CC 2, and sub-CC 4. In addition, it is assumed that an SS/PBCH block of sub-CC 2 is a cell-defining SS block of the target UE. In the example of FIG. 1S, the base station may instruct the terminal to measure an SS/PBCH block included in sub-CC 1 or sub-CC 4. In this example, the base station may use a method for notifying the terminal of a frequency value (an NR absolute radio-frequency channel number (NR ARFCN)) of the corresponding SS/PBCH block via a configuration message for measurement.

In FIG. 1S, physical cell identity (PCID) #1, PCID #2, and PCID #3 within respective SS/PBCH blocks existing in sub-CC 1, sub-CC 2, and sub-CC 4 may have the same values or different values. Also, at least two PCIDs may have the same values. For example, PCID #1 and PCID #2 of SS/PBCH block 1 and SS/PBCH block 2 existing in consecutive sub-CC 1 and sub-CC 2 may have the same values, and PCID #3 of SS/PBCH block 3 existing in sub-CC 4 may have a value different from those of PCID #1 and PCID #2.

FIG. 1T illustrates a flowchart of an example of an initial access procedure according to an embodiment. An initial access procedure may be performed in a process in which a terminal first camps on a cell at a time point at which the terminal is powered on. Also, an initial access procedure may be performed when a public land mobile network (PLMN) is changed. Alternatively, an initial access procedure may be performed in a process in which the terminal again camps on a cell after losing a network. Alternatively, an initial access procedure may be performed in a process in which the terminal camps on a cell existing in an area where the terminal is located after moving in an idle state. Alternatively, an initial access procedure may be performed in a process in which the terminal in a connected state camps on a cell existing around the terminal according to an indication of the base station or the determination of the terminal.

An initial access procedure of the terminal will be described taking, as an example, a system assumed in a part related to FIG. 1S. This configuration corresponds to only a scenario having one possibility among various possibilities, and thus the disclosure is not limited thereto.

Referring to FIG. 1T, in operation 1t-10, the terminal may perform energy detection, and may search for an SS/PBCH block. The terminal may search for an SS/PBCH block in a carrier frequency band by utilizing SS raster information. In this example, the SS raster information may be information indicating a position at which an SS can be detected, and may be, for example, a global synchronization channel number (GSCN) or an NR ARFCN. Accordingly, in a scenario of FIG. 1S, the terminal may detect a PSS and an SSS of sub-CC 2.

According to an embodiment, the terminal may perform a method for detecting multiple SS/PBCH blocks included in a band based on a sequence of a PSS, and selecting one SS/PBCH block from the detected multiple SS/PBCH blocks. Information on the detected multiple SS/PBCH blocks may be utilized in a measurement operation.

According to an embodiment, the terminal may select an SS/PBCH block having the largest correlation peak value. Alternatively, the terminal may select an SS/PBCH block having the largest signal-to-noise ratio (SNR)/received signal strength indicator (RSSI).

When an SS/PBCH block is transmitted on a multi-beam, the terminal may select one of SS/PBCH blocks received on a reception beam (an Rx beam) of the terminal.

In operation 1t-20, the terminal may perform cell search. The terminal may identify whether there is a cell mapped to either the PSS or the SSS detected in operation 1t-10, by using a known PSS sequence and a known SSS sequence. Through this configuration, the terminal may detect a PCID of the corresponding cell. Further, simultaneously with this process, or before or after this process, a synchronization process for DL sync may be performed.

In operation 1t-30, the terminal may perform measurement. The terminal may calculate or measure a quality based on RSRP of a PBCH DMRS and the like which have been identified based on RSRP of the selected SS/PBCH block and the determined PCID. This process may be performed before operation 1t-20, may be performed simultaneously with operation 1t-20, or may be performed after operation 1t-20.

In operation 1t-40, the terminal may perform PBCH decoding in relation to the PSS/SSS within the SS/PBCH block detected in operation 1t-10. According to the scenario of FIG. 1S, the terminal may perform PBCH decoding in relation to a PSS/SSS within the SS/PBCH block of sub-CC 2.

The terminal may acquire, from a PBCH, control resource set (CORESET) information related to remaining minimum system information (RMSI). The terminal may acquire RMSI data by decoding a CORESET related to the RMSI based on the acquired information. Then, the terminal may acquire random-access channel (RACH) configuration information from the RMSI. The terminal may perform a RACH procedure based on the RACH configuration information acquired from the RMSI. When the terminal receives an RRC configuration message via MSG 4 during the RACH procedure, an RRC state of the terminal may be changed to an RRC-connected state.

Further, the terminal may identify a time position of an SS/PBCH block which is actually transmitted via a network and is included in an RRC reconfiguration message.

The terminal having the changed RRC-connected state may transmit information on UE capability. The UE capability may include information on a bandwidth in which the terminal can operate, and information on a band in which the terminal can operate. Also, the UE capability may include a time necessary for the terminal to process the received data. More specifically, the UE capability may include information on a time necessary for the terminal to process scheduling information received for UL data and transmit UL data based on the processed scheduling information. Further, the UE capability may include a time necessary for the terminal to process the received DL data and transmit an ACK/NACK for the DL data based on the processed DL data. In addition, the UE capability may include information on a combination of bands, of which the terminal can perform carrier aggregation. Then, an operating bandwidth of the terminal may be configured as an operating bandwidth matching UE RF capability, via an RRC reconfiguration message. For example, according to the scenario of FIG. 1S, sub-CC 1 to sub-CC 3 may be configured as an operating bandwidth of the terminal.

Further, one or more BWPs (in the scenario of FIG. 1S, configuration of one or more BWPs in a band including sub-CC 1 to sub-CC 3) may be configured via an RRC reconfiguration message, and the terminal may receive an RRC reconfiguration message including information related to a neighboring cell to be measured, for example, at least one piece of information among frequency and time information related to an SS/PBCH block and frequency and time information related to a channel status indication reference signal (CSI-RS).

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. For example, the embodiments of the disclosure may be partially combined to operate a base station and a terminal.

Further, although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants may be achieved on the basis of the technical spirit of the disclosure.

What is claimed is:

1. A method performed by a terminal in a wireless communication system, the method comprising:
   receiving a first radio resource control (RRC) message including RRC reconfiguration information;
   identifying whether the first RRC message includes a field for a secondary cell group (SCG) configuration in multi-radio dual connectivity (MR-DC);
   in case that the field for the SCG configuration in MR-DC is included in the first RRC message:
      identifying whether the RRC reconfiguration information is received within a field set to a new radio (NR) SCG or a field set to an evolved universal terrestrial radio access (EUTRA) SCG, wherein one of the field set to the NR SCG and the field set to the EUTRA SCG is included in the field for the SCG configuration in MR-DC;
   performing an RRC reconfiguration on the NR SCG, in case that the RRC reconfiguration information is received within the field set to the NR SCG; and
   performing an RRC reconfiguration on the EUTRA SCG, in case that the RRC reconfiguration information is received within the field set to the EUTRA SCG.

2. The method of claim 1, further comprising:
   performing an RRC reconfiguration on an SCG in case that the first RRC message includes the RRC reconfiguration information for the SCG;
   identifying whether the first RRC message is received via a signaling radio bearer(SRB) 3; and
   in case that the first RRC message is received via the SRB 3, transmitting a second RRC message including RRC reconfiguration complete information via the SRB 3 to a lower layer.

3. The method of claim 1, further comprising:
   in case that the RRC reconfiguration information is received within the first field set to the NR SCG, and information for synchronous reconfiguration is included in the RRC reconfiguration information, triggering a random access procedure on the NR SCG, wherein the first RRC message is received via a SRB 1, and wherein the random access procedure is triggered by an RRC layer.

4. The method of claim 1, further comprising:
   identifying whether the field for the SCG configuration in MR-DC includes information on a counter associated with a key; and
   updating the key based on the information on the counter associated with the key, in case that the field for the SCG configuration in MR-DC includes the information on the counter associated with the key.

5. A method performed by a master cell group (MCG) in a wireless communication system, the method comprising:
   transmitting, to a terminal, a first radio resource control (RRC) message including RRC reconfiguration information;
   in case that the first RRC message includes a field for a secondary cell group (SCG) configuration in multi-radio dual connectivity (MR-DC), and the RRC reconfiguration information is transmitted within a field set to a new radio (NR) SCG, receiving, from the terminal, a second RRC message associated with the NR SCG; and
   in case that the first RRC message includes the field for the SCG configuration in MR-DC, and the RRC reconfiguration information is transmitted within a field set to an evolved universal terrestrial radio access (EUTRA) SCG, receiving, from the terminal, a second RRC message associated with the EUTRA SCG,
   wherein one of the field set to the NR SCG and the field set to the EUTRA SCG is included in the field for the SCG configuration in MR-DC.

6. The method of claim 5, further comprising:
   receiving, from the terminal, a third RRC message associated with an SCG in case that the first RRC message includes the RRC reconfiguration information for the SCG,
   wherein whether the first RRC message is received via a signaling radio bearer (SRB) 1 is identified by the terminal.

7. The method of claim 6, wherein:
   a random access procedure on the NR SCG is triggered by the terminal in case that the first the RRC reconfiguration information is received within the field set to NR SCG, and information for synchronous reconfiguration is included in the RRC reconfiguration information,
   the first RRC message is received via a SRB 1, and the random access procedure is triggered by an RRC layer.

8. A terminal comprising:
   a transceiver configured to be capable of transmitting or receiving at least one signal; and
   a controller configured to be connected to the transceiver, wherein the controller is configured to:
      receive a first radio resource control (RRC) message including RRC reconfiguration information,
      identify whether the first RRC message includes a field for a secondary cell group (SCG) configuration in multi-radio dual connectivity (MR-DC),
      in case that the field for the SCG configuration in MR-DC is included in the first RRC message:
         identify whether the RRC reconfiguration information is received within a field set to a new radio (NR) SCG or a field set to an evolved universal terrestrial radio access (EUTRA) SCG, wherein one of the field set to the NR SCG and the field set to the EUTRA SCG is included in the field for the SCG configuration in MR-DC, perform an RRC reconfiguration on the NR SCG, in case that the RRC reconfiguration information is received within the field set to the NR SCG, and perform an RRC reconfiguration on the EUTRA SCG, in case that the RRC reconfiguration information is received within the field set to the EUTRA SCG.

9. The terminal of claim 8, wherein the controller is further configured to:

perform an RRC reconfiguration on an SCG in case that the first RRC message includes the RRC reconfiguration information for the SCG, identify whether the first RRC message is received via a first signaling radio bearer (SRB) 3, and in case that the first RRC message is received via the SRB 3, transmitting a second RRC message including RRC reconfiguration complete information via the SRB 3 to a lower layer.

10. The terminal of claim 8, wherein the controller is further configured to:

in case that the RRC reconfiguration information is received within the field set to the NR SCG, and information for synchronous reconfiguration is included in the RRC reconfiguration information, trigger a random access procedure on the NR SCG, wherein the first RRC message is received via a SRB 1, and wherein the random access procedure is triggered by an RRC layer.

11. The terminal of claim 8, wherein the controller is further configured to:

identify whether the field for the SCG configuration in MR-DC includes information on a counter associated with a key, and update the key based on the information on the counter associated with the key, in case that field for the SCG configuration in MR-DC includes the information on the counter associated with the key.

12. A master cell group (MCG) comprising:

a transceiver configured to be capable of transmitting or receiving at least one signal; and a controller configured to be connected to the transceiver, wherein the controller is configured to:

transmit, to a terminal, a first radio resource control (RRC) message including RRC reconfiguration information, in case that the first RRC message includes a field for a secondary cell group (SCG) configuration in multi-radio dual connectivity (MR-DC), and the RRC reconfiguration information is transmitted within a field set to a new radio (NR) SCG, receive, from the terminal, a second RRC message associated with the NR SCG, and in case that the first RRC message includes the field for the SCG configuration in MR-DC, and the RRC reconfiguration information is transmitted within a field set to an evolved universal terrestrial radio access (EUTRA) SCG, receive, from the terminal, a second RRC message associated with the EUTRA SCG, wherein one of the field set to the NR SCG and the field set to the EUTRA SCG is included in the field for the SCG configuration in MR-DC.

13. The MCG of claim 12, wherein the controller is further configured to:

receive, from the terminal, a third RRC message associated with an SCG in case that the first RRC message includes the RRC reconfiguration information for the SCG, wherein whether the first RRC message is received via a signaling radio bearer (SRB) 1 is identified by the terminal.

14. The MCG of claim 12, wherein:

a random access procedure on the NR SCG is triggered by the terminal in case that the RRC reconfiguration information is received within the first field set to NR SCG, and information for synchronous reconfiguration is included in the RRC reconfiguration information, the first RRC message is received via a SRB 1, and the random access procedure is triggered by an RRC layer.

* * * * *